US006947184B1

(12) United States Patent
Onishi et al.

(10) Patent No.: US 6,947,184 B1

(45) Date of Patent: Sep. 20, 2005

(54) INTEGRAL IMAGE READIN/WRITING HEAD, IMAGE PROCESSOR PROVIDED WITH THIS, IMAGE READING HEAD AND PRINT HEAD

(75) Inventors: Hiroaki Onishi, Kyoto (JP); Hisayoshi Fujimoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/831,165

(22) PCT Filed: Nov. 8, 1999

(86) PCT No.: PCT/JP99/06218

§ 371 (c)(1),
(2), (4) Date: May 7, 2001

(87) PCT Pub. No.: WO00/28727

PCT Pub. Date: May 18, 2000

(30) Foreign Application Priority Data

| | | |
|---|---|---|
| Nov. 9, 1998 | (JP) | 10-317533 |
| Nov. 30, 1998 | (JP) | 10-339180 |
| Dec. 4, 1998 | (JP) | 10-345206 |

(51) Int. Cl.[7] .............................................. H04N 1/024

(52) U.S. Cl. ...................... 358/472; 358/483; 358/474; 358/512; 250/208.1; 257/678; 347/256; 347/241; 399/144; 382/312

(58) Field of Search ................................ 347/256, 241; 358/472, 483, 496, 498, 482, 474, 401, 501, 358/505, 512–514; 382/312, 318; 399/144, 399/211; 250/208.1, 234–236, 227.2, 216, 250/239

(56) References Cited

U.S. PATENT DOCUMENTS

| | | | | |
|---|---|---|---|---|
| 5,570,122 | A | 10/1996 | Imamura et al. | 347/171 |
| 6,448,995 | B1 * | 9/2002 | Fujimoto et al. | 347/241 |
| 6,864,999 | B1 * | 3/2005 | Fujimoto et al. | 358/472 |

FOREIGN PATENT DOCUMENTS

| | | | |
|---|---|---|---|
| JP | 04-223666 | 8/1992 | H04N 1/031 |
| JP | 05-091245 | 4/1993 | H04N 1/028 |
| JP | 05-219304 | 8/1993 | H04N 1/032 |
| JP | 06-046227 | 2/1994 | H04N 1/23 |
| JP | 06-091960 | 4/1994 | B41J 11/42 |
| JP | 10-051587 | 2/1998 | H04N 1/024 |

* cited by examiner

*Primary Examiner*—Twyler Lamb
*Assistant Examiner*—Heather D. Gibbs
(74) *Attorney, Agent, or Firm*—Michael Bednarek; Pillsbury Winthrop Shaw Pittman LLP

(57) ABSTRACT

An image read/write head (A) includes a support (7) for supporting at least one of paired platen rollers ($P_1$, $P_2$) and a detector (2) for detecting at least one of a document (D) and a recording paper (K). Therefore, an image processing apparatus incorporating the image read/write head (A) can be easily manufactured. The image read/write head (A) further includes a reflection preventing member (6) for collectively surrounding the plurality of light receiving elements (3) and the plurality of drive IC chips (80). Therefore, it is possible to prevent the plurality of light receiving elements from receiving scattering light or disturbing external light.

18 Claims, 13 Drawing Sheets

INTEGRAL IMAGE READIN/WRITING HEAD, IMAGE PROCESSOR PROVIDED WITH THIS, IMAGE READING HEAD AND PRINT HEAD

TECHNICAL FIELD

The present invention relates to an image read/write head having both an image reading function and an image printing function, and an image processing apparatus incorporating such a image read/write head. The present invention also relates to an image read head having an image reading function and a printhead having an image printing function.

BACKGROUND ART

Examples of image processing apparatus include a facsimile machine. A facsimile machine needs to have both an image reading function and an image printing function. Further, it is desired that a facsimile machine is so structured to have a size as small as possible.

Therefore, a prior art image read/write head H has the structure as shown in FIG. 15. The image read/write head H includes a case 1*e* and a transparent cover 19*e* mounted on an upper portion of the case. The head case 1*e* accommodates light sources 30*e* for illuminating an image reading line Se defined on a surface of the transparent cover 19*e*, and lenses 5*e*. A substrate 4*e* is mounted at the bottom of the case 1*e*. The substrate 4*e* has an obverse surface 40 and a reverse surface 41 respectively provided with a plurality of light receiving elements 3*e* and a plurality of heating elements 8*e* in respective rows extending longitudinally of the substrate 4*e*. On the reverse surface 41 of the substrate 4*e* are also mounted a plurality of drive IC chips 80*e* incorporating driving circuits for providing drive control of the heating elements 8*e*.

With such an image read/write head H, a document D is transferred by a platen roller $P_1$ in close contact with the obverse surface of the transparent cover 19*e*. During the transferring step, a surface of the document D is illuminated by the light sources 30*e*. The light reflected by the document D is collected by the lenses 5*e*, thereby forming an image of the document D on the light receiving elements 3*e*, which output image signals. On the other hand, a recording paper K of heat-sensitive type is transferred by a platen roller $P_2$ in close contact with the heating elements 8*e*. During the transferring step, the driving circuits in the drive IC chips 80*e* drive selected ones of the heating elements 8*e* for heat generation. As a result, an image is printed on the recording paper K. The facsimile machine incorporating the image read/write head H can be made smaller in thickness than a facsimile machine in which a reading head and a printing head are separately provided.

However, the above-described prior art structure has the following problems.

Firstly, as described above, the image read/write head H is used in combination with a pair of platen rollers $P_1$ and $P_2$ for a document and a recording paper, respectively. Therefore, it is desired that the image read/write head H has such a structure as to allow easy positioning and mounting of the platen rollers $P_1$ and $P_2$ relative to the image read/write head. However, the prior art image read/write head H does not include such positioning or mounting means, which is inconvenient.

Secondly, the platen rollers $P_1$, $P_2$ are disposed so as to sandwich the image read/write head H, so that the image read/write head H in combination with the platen rollers $P_1$ and $P_2$ becomes bulky in the thickness direction of the image read/write head.

Thirdly, in manufacturing the image read/write head H, after a plurality of light receiving elements 3*e* are mounted on an obverse surface 40 of a substrate 4, the substrate needs to be turned over for mounting a plurality of heating elements 8 and a plurality of drive IC chips 80 on a reverse surface 41 of the substrate 4. Moreover, wiring patterns with respect to these components also need to be provided on both the obverse and the reverse surfaces 40, 41 of the substrate 4. Therefore, the image read/write head H cannot be efficiently manufactured.

Fourthly, there is a likelihood that the light receiving elements 3*e* receive inappropriate light which may cause noises. Specifically, with the above-described prior art structure, the light passing through the lenses 5*e* may be reflected in a scattering manner by the wall surfaces around the light receiving elements 3*e*, and the scattering light may be received by the light receiving elements 3*e*. Moreover, light from outside the case 1*e* may enter the case 1*e* through a small gap defined between the case 1*e* and the substrate 4*e* to be received by the light receiving elements 3*e*.

Fifthly, with the prior art image read/write head H, it is impossible to determine whether or not the document D is fed onto the transparent cover 19*e*. Similarly, it is also impossible to determine whether or not the recording paper K is fed on the heating elements 8. Therefore, as indicated by phantom lines in FIG. 15, sensors 99*a*, 99*b* for detecting the presence or absence of the document D and the recording paper K, respectively, need to be provided separately from the image read/write head H. With such an arrangement, the sensors 99*a*, 99*b* and the image read/write head H need to be individually mounted at respective positions, which makes the manufacturing process of an image processing apparatus troublesome. Further, the image reading operation may be controlled to be interrupted when the document D is advanced by a predetermined distance after the trailing edge of the document D is detected by the sensor 99*a*. In such a case, it is necessary to precisely set the distance between the sensor 99*a* and the image reading line Se of the image read/write head H, which is also troublesome.

DISCLOSURE OF THE INVENTION

It is an object of the present invention to eliminate or reduce problems of the prior art described above.

In accordance with a first aspect of the present invention, there is provided an image read/write head comprising a substrate which carries a plurality of light receiving elements, a plurality of printing elements and a plurality of drive IC chips incorporating driving circuits for providing drive control of the printing elements, a case mounted on the substrate for surrounding the plurality of light receiving elements while avoiding the plurality of printing elements, a transparent cover mounted to the case for contact with a document being transferred, a light source disposed in the case for illuminating the document, and a plurality of lenses disposed in the case for forming, on the plurality of light receiving elements, an image of the document illuminated by the light source. The image read/write head further includes supporting means for supporting a platen roller disposed in facing relationship to at least either one of the transparent cover and the plurality of printing elements.

With such a structure, by supporting the platen roller by the supporting means, the platen roller can be easily positioned relative to the image read/write head. Further, it is also possible to facilitate the mounting of the platen roller.

Preferably, the case and the supporting means may be integrally molded of resin.

With such a structure, it is possible to prevent the number of parts of the image read/write head from increasing, so that the production efficiency of the image read/write head can be prevented from being deteriorated.

Preferably, each of the printing elements may comprise a heating element. The substrate may be mounted to a heat sink plate, and part of the heat sink plate may provide the supporting means.

With such a structure, heat generated at the heating elements can be allowed to dissipate through the heat sink plate to the outside. Therefore, it is possible to prevent the heating elements from being overheated, thereby enhancing the quality of printed images. Since the supporting means is provided by utilizing the heat sink plate, another part for providing the support means need not be provided. Therefore, it is possible to prevent the number of parts from increasing.

Preferably, the plurality of light receiving elements, the plurality of printing elements and the plurality of drive IC chips may be mounted on a same surface of the substrate.

With such a structure, unlike the above-described prior art, mounting of the light receiving elements, the printing elements, the drive IC chips can be performed without turning over the substrate. Further, a wiring pattern with respect to the above-described elements and the drive IC chips can also be formed on the same surface of the substrate, so that the production efficiency of the image read/write head can be enhanced. Moreover, the pair of platen rollers for a document and a recording paper, respectively, can be arranged so as not to sandwich the image read/write head in the thickness direction thereof. Accordingly, it is possible to accomplish thickness reduction of the image read/write head combined with the pair of platen rollers.

Preferably, the light receiving elements may be integrally built in the drive IC chips.

With such a structure, it is possible to decrease the number of parts mounted on the substrate, so that the production efficiency of the image read/write head can be enhanced.

In accordance with a second aspect of the present invention, there is provided an image processing apparatus comprising an image read/write head and a pair of platen rollers for a document and a recording paper, respectively. The image read/write head includes a substrate which carries a plurality of light receiving elements, a plurality of printing elements and a plurality of drive IC chips incorporating driving circuits for providing drive control of the printing elements, a case mounted on the substrate for surrounding the plurality of light receiving elements while avoiding the plurality of printing elements, a transparent cover mounted to the case for contact with a document being transferred, a light source disposed in the case for illuminating the document, and a plurality of lenses disposed in the case for forming, on the plurality of light receiving elements, an image of the document illuminated by the light source. The image read/write head further includes supporting means for supporting at least one of the paired platen rollers.

With the image processing apparatus having the above-described structure, the same advantages as those obtained by the first aspect of the present invention can be obtained.

Preferably, each of the platen rollers may be held by a member provided separately from the image read/write head, and the supporting means may be fitted on a shaft portion of the recording paper platen roller for allowing pivotal movement of the image read/write head about the shaft portion. The image read/write head may be biased by an elastic member in a pivotal direction for pressing the transparent cover against the document platen roller.

With such a structure, it is possible to position the recording paper platen roller relative to the image read/write head. The recording paper platen roller can be easily and precisely arranged at an appropriate position relative to the printing elements. Moreover, by utilizing the elastic force of the elastic member, the transparent cover can be pressed against the document platen roller with an appropriate force. Therefore, the document can be appropriately transferred as pressed against the transparent cover by the document platen roller.

In accordance with a third aspect of the present invention, there is provided an image read/write head comprising a substrate which carries a plurality of light receiving elements, a plurality of printing elements and a plurality of drive IC chips incorporating driving circuits for providing drive control of the printing elements, a case mounted on the substrate for surrounding the plurality of light receiving elements while avoiding the plurality of printing elements, a transparent cover mounted to the case for contact with a document being transferred, a light source disposed in the case for illuminating the document, and a plurality of lenses disposed in the case for forming, on the plurality of light receiving elements, an image of the document illuminated by the light source. The plurality of light receiving elements, the plurality of printing elements and the plurality of drive IC chips are mounted on a same surface of the substrate. The image read/write head further includes a reflection preventing member provided separately from the case for collectively surrounding the plurality of light receiving elements and the plurality of drive IC chips.

The image read/write head having the above-described structure has the following advantages.

Firstly, since the light receiving elements are surrounded by the reflection preventing member, it is possible to prevent the light traveling from the document to the light receiving elements from being scattered and reflected around the light receiving elements. Further, since the reflection preventing member also blocks external light, it is possible to prevent the light receiving elements from receiving such external light. Therefore, a high image reading quality with little noise can be provided. Particularly, in the present invention, the reflection preventing member is provided separately from the case. Therefore, it is possible to select an optimum reflection preventing member of a configuration, size, material and color suitable for the prevention of light reflection and the blocking of light.

Secondly, since the reflection preventing member collectively surrounds the light receiving elements and the drive IC chips, mounting of the reflection preventing member can be performed easily and reliably. Specifically, to surround the light receiving elements separately from the drive IC chips by a reflection preventing member, the reflection preventing member needs to be made small, so that the handling thereof becomes difficult. Further, in such a case, the reflection preventing member is likely to come into contact with the drive IC chips and the light receiving elements. When wires are bonded to the drive IC chips and the light receiving elements, the reflection preventing member may also come into contact with the wires, thereby causing breakage of the wires. This problem is more likely to occur in the case where the drive IC chips and the light receiving elements are arranged close to each other for reducing the size of the image read/write head. According to the present invention, however, the light receiving elements and the drive IC chips are collectively surrounded by the reflection preventing member, the above-described problems are less likely to occur.

Thirdly, since the light receiving elements, the printing elements and the drive IC chips are mounted on the same surface of the substrate, the same advantages as those obtained by the first aspect of the present invention can be obtained. That is, the mounting of the respective elements and the drive IC chips, and the provision of the wiring pattern with respect to these components can be performed easily, which leads to enhancement of the production efficiency. Further, it is possible to reduce the total thickness of the image read/write head in combination with the paired platen rollers.

Preferably, the reflection preventing member may be black.

With such a structure, the reflection preventing member can absorb light reaching thereto so that it is possible to more reliably prevent light from scattering and reflecting.

Preferably, the reflection preventing member may include mounting means for positioning and mounting the reflection preventing member with respect to the case.

With such a structure, it is possible to facilitate the assembling of the image read/write head.

Preferably, the reflection preventing member may include an upper wall facing but spaced from the plurality of light receiving elements and the plurality of drive ICs thicknesswise of the substrate. The upper wall may includes a slit for allowing light traveling through the plurality of lenses to reach the plurality of light receiving elements. The reflection preventing member may also include a plurality of elastically deformable side walls projecting from the upper wall toward the substrate into contact therewith.

With such a structure, the light receiving elements and the drive ICs can be appropriately surrounded by the upper wall and the sidewalls. Since the sidewalls are elastically deformed into contact with the substrate, it is unlikely that gaps are defined between the side walls and the substrate. Therefore, it is possible to reliably prevent external light from entering the region surrounded by the reflection preventing member.

Preferably, the substrate may be black at least at portions in contact with the plurality of side walls.

With such a structure, even if such gaps are formed, most of the light progressing through the gaps can be absorbed by the black portions of the substrate. This further reliably prevents the external light from entering the region surrounded by the reflection preventing member.

Preferably, the light source may be mounted beside the plurality of light receiving elements on the surface of the substrate on which the plurality of light receiving elements are mounted. The reflection preventing member may include a side wall for separating the light source from the plurality of light receiving elements.

With such a structure, since all of the light receiving elements, the printing elements, the drive ICs and the light source are mounted on the same surface of the substrate, the production efficiency of the image read/write head can be enhanced. The reflection preventing member appropriately prevents the light emitted from the light sources from directly reaching the light receiving elements.

In accordance with a fourth aspect of the present invention, there is provided an image read/write head comprising a substrate which carries a plurality of light receiving elements, a plurality of printing elements and a plurality of drive IC chips incorporating driving circuits for providing drive control of the printing elements, a case mounted on the substrate for surrounding the plurality of light receiving elements while avoiding the plurality of printing elements, a transparent cover mounted to the case for contact with a document being transferred, a light source disposed in the case for illuminating the document, and a plurality of lenses disposed in the case for forming, on the plurality of light receiving elements, an image of the document illuminated by the light source. The image read/write head further includes detecting means for detecting at least one of the document fed onto the transparent cover and a recording paper fed to a position facing the plurality of printing elements.

With the image read/write head having such a structure, the image read/write head itself is provided with means for detecting the document or the recording paper. Therefore, it is possible to eliminate the necessity for providing detecting means for the document or the recording paper separately from the image read/write head, or to reduce the number of such separate detecting means. Further, it is possible to easily and precisely position the detecting means relative to respective parts of the image read/write head. Therefore, it is possible to reduce the cost for manufacturing an image processing apparatus utilizing the image read/write head.

Preferably, the detecting means may include a movable member having one end for contacting the document in a document transfer path. The movable member has another end for facing the light source. The movable member is so arranged that said another end blocks light traveling from the light source toward the transparent cover when said one end is out of contact with the document, whereas said another end retreats to a position which does not block the light when said one end is in contact with the document.

With such a structure, the presence or absence of the document can be determined by utilizing the light source or the light receiving elements incorporated in the image read/write head. Specifically, when the document is not fed toward the transparent cover and hence is not in contact with the one end of the movable member, the light traveling from the light source toward the transparent cover is blocked by the another end of the movable member. In this case, therefore, the light receiving elements do not receive the light emitted from the light source. On the other hand, when the document is fed toward the transparent cover and is in contact with the one end of the movable member, the another end retreats to a position which does not block the light emitted from the light source. In this case, therefore, the light emitted from the light source is reflected by the document on the transparent cover to be received by the light receiving elements. In this way, the presence or absence of the document can be determined by whether or not the light receiving elements receive the light. With the above-described structure, the presence of absence of the document can be determined by effectively utilizing the parts originally incorporated in the image read/write head. Such a structure is reasonable and allows the detecting means to be provided at a low cost.

Preferably, the detecting means may include a movable member having one end for contacting the document in the document transfer path. The movable member has another end arranged in a light path extending from the transparent cover to the plurality of light receiving elements. The movable member is so arranged that said another end blocks light traveling from the transparent cover toward the plurality of light receiving elements when said one end is out of contact with the document, whereas said another end retreats to a position which does not block the light when said one end is in contact with the document.

With such a structure, when the document is not fed toward the transparent cover and hence is not in contact with the one end of the movable member, the another end of the movable member blocks the light traveling from the transparent cover toward the light receiving elements. In this case, therefore, the light receiving elements do not receive the light emitted from the light source. On the other hand, when the document is fed toward the transparent cover and is in contact with the one end of the movable member, the another end retreats to a position which does not block the light reflected by the surface of the document. In this case, therefore, the light is received by the light receiving elements. In this way, also with this structure, the presence or absence of the document can be determined by effectively utilizing the parts originally incorporated in the image read/write head.

Preferably, the detecting means may include a movable member having one end for contacting the recording paper in a recording paper transfer path. The movable member has another end arranged in a light path extending from the transparent cover to the plurality of light receiving elements. The movable member is so arranged that said another end moves between a position for blocking light traveling from the transparent cover toward the plurality of light receiving elements and a position which does not block the light depending on whether or not said one end is in contact with the recording paper.

With such a structure, in accordance with the presence or absence of the recording paper at a predetermined position, the light receiving elements shift between a state capable of receiving the light traveling from the transparent cover and a state incapable of receiving such light. Therefore, the presence or absence of the recording paper at the predetermined position can be determined by whether or not the light receiving elements are in a state capable of receiving light. Thus, with the above-described structure, the presence or absence of the recording paper can be determined by effectively utilizing the parts originally incorporated in the image read/write head, which is reasonable.

In accordance with a fifth aspect of the present invention, there is provided an image read/write head comprising a substrate which carries a plurality of light receiving elements, a plurality of printing elements and a plurality of drive IC chips incorporating driving circuits for providing drive control of the printing elements, a case mounted on the substrate for surrounding the plurality of light receiving elements but avoiding the plurality of printing elements, a transparent cover mounted to the case for contact with a document being transferred, a light source disposed in the case for illuminating the document and a plurality of lenses disposed in the case for forming, on the plurality of light receiving elements, an image of the document illuminated by the light source. The plurality of light receiving elements, the plurality of printing elements and the plurality of drive IC chips are mounted on a same surface of the substrate. The image read/write head further includes supporting means for supporting a platen roller disposed in facing relationship to at least either one of the transparent cover and the plurality of printing elements, a reflection preventing member provided separately from the case for collectively surrounding the plurality of light receiving elements and the plurality of drive IC chips and detecting means for detecting at least one of the document fed onto the transparent cover and a recording paper fed to a position facing the plurality of printing elements.

With the image read/write head having such a structure, it is possible to obtain the same advantages as those of the image read/write head provided in accordance with each of the first, the third and the fourth aspects of the present invention.

In accordance with a sixth aspect of the present invention, there is provided an image read head comprising a substrate which carries a plurality of light receiving elements, a case mounted on the substrate for surrounding the plurality of light receiving elements, a transparent cover mounted to the case for contact with a document being transferred, a light source disposed in the case for illuminating the document and a plurality of lenses disposed in the case for forming, on the plurality of light receiving elements, an image of the document illuminated by the light source. The image read/write head further includes detecting means for detecting the document fed onto the transparent cover.

With the image read/write head having such a structure, it is possible to eliminate or lessen the necessity for separately providing means for detecting the document. Further, it is possible to easily and precisely position the detecting means relative to respective parts of the image read/write head. Therefore, it is possible to reduce the cost for manufacturing an image processing apparatus utilizing the image read/write head.

In accordance with a seventh aspect of the present invention, there is provided a printhead including a substrate carrying a plurality of printing elements. The printhead includes detecting means for detecting a recording paper fed to a position facing the plurality of printing elements.

With the printhead having such a structure, it is possible to eliminate or lessen the necessity for separately providing means for detecting the recording paper. Further, it is possible to easily and precisely position the detecting means relative to the respective parts of the printhead. Therefore, it is possible to reduce the cost for manufacturing a printer utilizing the printhead.

Other features and advantages of the present invention will become clearer from the detailed description of preferred embodiments given below with reference to the accompanying drawings.

BEST MODE FOR CARRYING OUT THE INVENTION

Preferred embodiments of the present invention will be described below with reference to the accompanying drawings.

FIGS. 1 through 5 illustrate an example of image read/write head according to the present invention.

Figure 1:
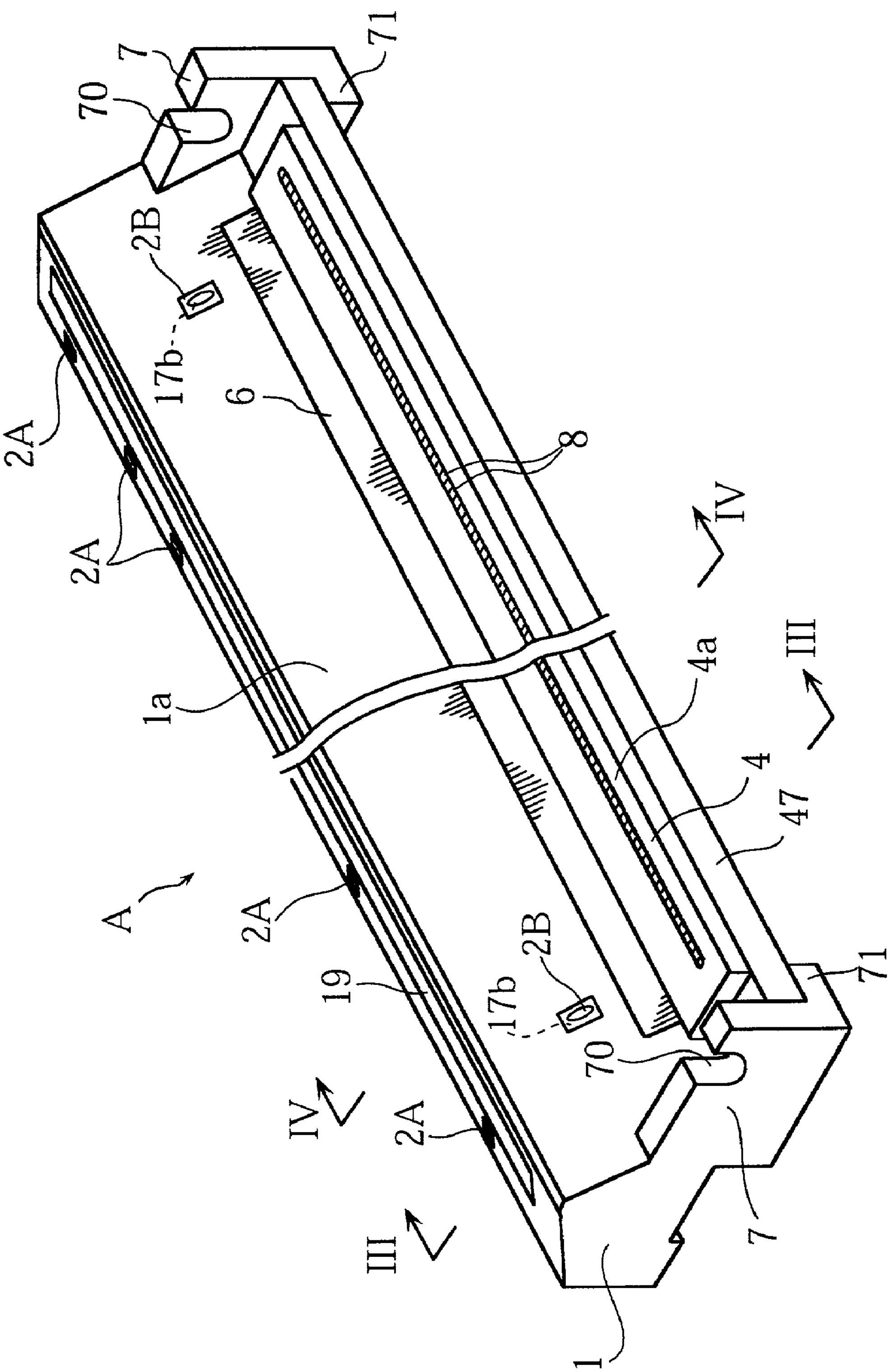
FIG. 1 is a perspective view showing an example of image read/write head in accordance with the present invention.
Figure 2:
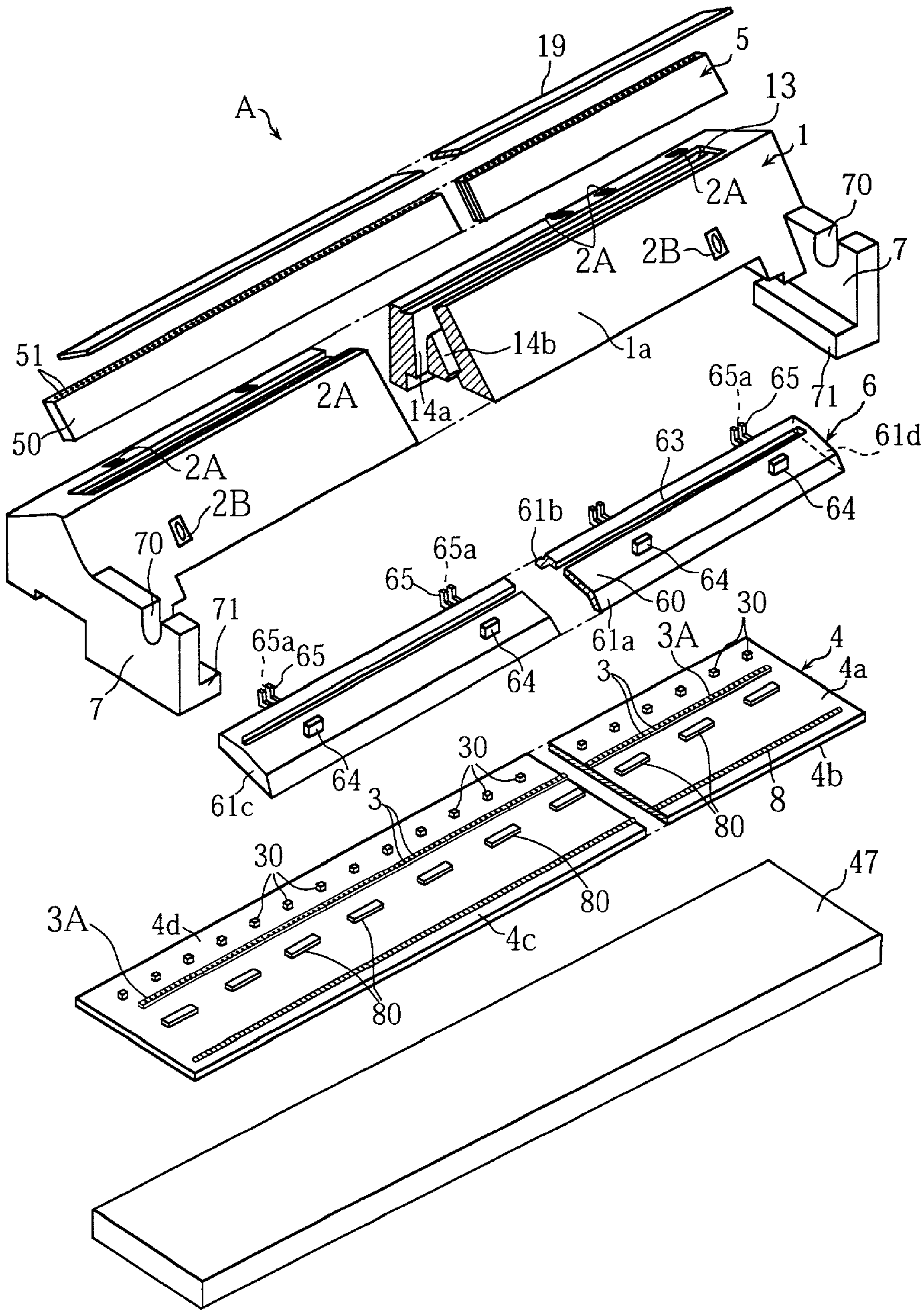
FIG. 2 is an exploded perspective view of the image read/write head shown in FIG. 1.

As clearly shown in FIGS. 1 through 3, the image read/write head A comprises a case 1, a plurality of sensors 2A for detecting a document, a plurality of sensors 2B for detecting a recording paper, a transparent cover 19, a lens array 5, a reflection preventing member 6, a substrate 4, a heat sink plate 47 and other parts which will be described later.

The substrate 4, which may be made of a ceramic material for example, is in the form of an elongated rectangular plate. The substrate 4 has an obverse surface (upper surface) 4*a* which is provided with a plurality of light sources 30, a plurality of light receiving elements 3, a plurality of drive IC chips 80 and a plurality of heating elements 8.

The light sources 30, each of which may comprise an LED chip, are arranged on the substrate 4 at a predetermined pitch in a row extending longitudinally of the substrate. The light receiving elements 3 for performing photo-electric conversion are integrally built in sensor IC chips 3A which are rectangular semiconductor chips. The sensor IC chips 3A are mounted in a row on the substrate 4 in such a manner that the row of light receiving elements 3 extends substantially in parallel to the row of light sources 30. The heating elements 8, which are an example of printing elements in the claimed invention, are arranged similarly to that used in a conventional thermal printhead. Specifically, the heating elements 8 may be provided by printing and baking a thick film of resistor paste containing, for example, ruthenium oxide as a conductive substance into a line extending longitudinally of the substrate 4, and then providing a wiring pattern to electrically divide the resistor line at a predetermined pitch longitudinally thereof. The drive IC chips 80 incorporate driving circuits for controlling the heating operation of the heating elements 8. Similarly to the light sources 30, the drive IC chips are arranged at a predetermined pitch in a row extending longitudinally of the substrate 4.

The row of heating elements 8 is disposed on the substrate 4 at or adjacent one longitudinal edge 4*c* of the substrate 4. On the other hand, the rows of drive IC chips 80, light receiving elements 3 and light sources 30, respectively, are disposed at a portion which is closer to the other end edge 4*d* of the substrate 4 than the row of heating elements 8. The obverse surface 4*a* of the substrate 4 is formed with a wiring pattern (not shown) connected to the above-described components mounted on the obverse surface 4*a*. The substrate 4 is also provided, at appropriate portions, with one or plural connectors (not shown) which are electrically connected to the wiring pattern. By connecting an external device to the connector, it is possible to perform power supply and input/output of various signals with respect to the above-described components.

The heat sink plate 47 is provided for allowing heat generated at the heating elements 8 to dissipate to the outside. The heat sink plate may be made of a metal having a high heat conductivity. The heat sink plate 47 may comprise a plate which is substantially identical in size and configuration to the substrate 4. The heat sink plate may be bonded to the reverse surface 4*b* of the substrate 4 with a bonding tape or an adhesive.

The case 1, which may be made of a white synthetic resin, has an elongated configuration. The case 1 is integrally formed, at longitudinally opposite ends thereof, with a pair of supports 7 for supporting a platen roller $P_2$ for a recording paper. Each of the supports 7 projects laterally outward from an outer side surface 1*a* of the case 1, and has an upper portion formed with an upwardly open recess 70 for fitting a shaft portion of the platen roller $P_2$. The case 1 is mounted on the substrate 4 and the heat sink plate 47 in such a manner as to avoid the heating elements 8 and its adjacent portion but to cover other portions on the obverse surface 4*a* of the substrate 4. The substrate 4 projects laterally outwardly from the case 1 at a portion on which the heating elements 8 are mounted. The recess 70 of each support 7 is located on an extension line of the row of heating elements 8. Each of the supports 7 is formed with a respective one of paired projections 71 at a lower portion thereof, and the longitudinally opposite ends of the heat sink plate 47 are disposed on the pair of projections 71. Thus, the case 1, the substrate 4 and the heat sink plate 47 are stably combined with each other.

The transparent cover 19 is provided for guiding a document D thereon. The transparent cover is formed of a glass material or synthetic resin having a high transparency. The case 1 is formed, at the upper surface thereof, with a recess 13 into which the transparent cover 19 is fitted in facing relationship to the obverse surface 4*a* of the substrate 4 as spaced away therefrom. The upper surface of the case 1 and the recess 13 are inclined so that the transparent cover 19 is inclined correspondingly. Specifically, the transparent cover 19 is so inclined as to become lower as it extends farther from the edge 4*c* of the substrate 4. The outer side surface 1*a* of the case 1 is so inclined as to become farther from the edge 4*c* of the substrate 4 as it extends upwardly.

The lens array 5 comprises a plurality of lenses 51 arranged in a row and held in an elongated lens holder 50 formed of a synthetic resin. For the lens 51, use may be made of a selfoc lens capable of forming a non-inverted, non-magnified image of the document D on each of the light receiving elements 3. However, the present invention is not limited thereto, and other lenses may be employed for the present invention. The lens array 5 is fitted into a groove 12 formed in the case 1 and thereby built in the case 1 below and in facing relationship to the transparent cover 19. A linear portion of the obverse surface of the transparent cover 19 positionally corresponding to the lenses 51 serves as an image reading line S.

The case 1 internally defines a first light path 14*a* and a second light path 14*b* for guiding light emitted from the light sources 30. The first light path 14*a*, which extends over the height of the case 1, functions to guide light emitted from the light sources 30 to the image reading line S. The second light path 14*b*, which includes the groove 12, functions to guide the light reflected on the image reading line S to the light receiving elements 3 via the lenses 51. Since the case 1 is made of white synthetic resin as described before, the light emitted from the light sources 30 is guided to the image reading line S while being repetitively reflected on the white wall surfaces of the first light path 14*a* at a high reflectivity. Therefore, it is possible to efficiently illuminate the image reading line S.

The reflection preventing member 6 may be made of polycarbonate or ABS resin containing a black pigment or glass powder, for example. The reflection preventing member 6 has a black surface to provide high light absorption. The reflection preventing member 6 is disposed in a recess 11 formed at the bottom of the case 1 in such a manner as to surround the sensor IC chips 3A including the light receiving elements 3, and the drive IC chips 80. Specifically, the reflection preventing member 6 comprises an upper wall 60 located above the sensor IC chips 3A and the drive IC chips 80 and extending longitudinally of the case 1, and side walls 61*a*, 61*b* respectively projecting downward from widthwise opposite edges of the upper wall 60, and two side walls 61*c*, 61*d* respectively projecting downward from longitudinally opposite ends of the upper wall 60, as clearly shown in FIG. 2. These side walls 61*a*~61*d* surround the light receiving elements 3 and the drive ICs 80 on four sides. The reflection preventing member 6 originally has a height which is slightly greater than the height of the recess 11, so that the reflection preventing member is fitted into the recess 11 as compressed in the thickness direction. Therefore, each of the four side walls 61*a*~61*d* is elastically deformed appropriately to come into contact with the obverse surface 4*a* of the substrate 4 at the tip end thereof. The upper wall 60 is formed with a slit 63 for preventing the second light path 14*b* from being blocked.

The obverse surface 4*a* of the substrate 4 includes a black coating region (indicated by a reference sign N1 in FIG. 3) at portions which are in contact with the respective tip ends of the side walls 61*a*~61*d*. The black coating region is provided with a black glass layer formed by applying a glass paste containing a black pigment and then baking the same. Alternatively, the black coating region may be formed by applying a coating containing a Fe—Cr—Co-based or a Cu—Cr-based black pigment or a black pigment of another composition having a high light shielding ability. In the present invention, in addition to the above-described region, the black coating may be applied to the entire region of the obverse surface 4*a* of the substrate 4 surrounded by the reflection preventing member 6 and additionally to an excess region extending beyond the surrounded region.

Figure 4:
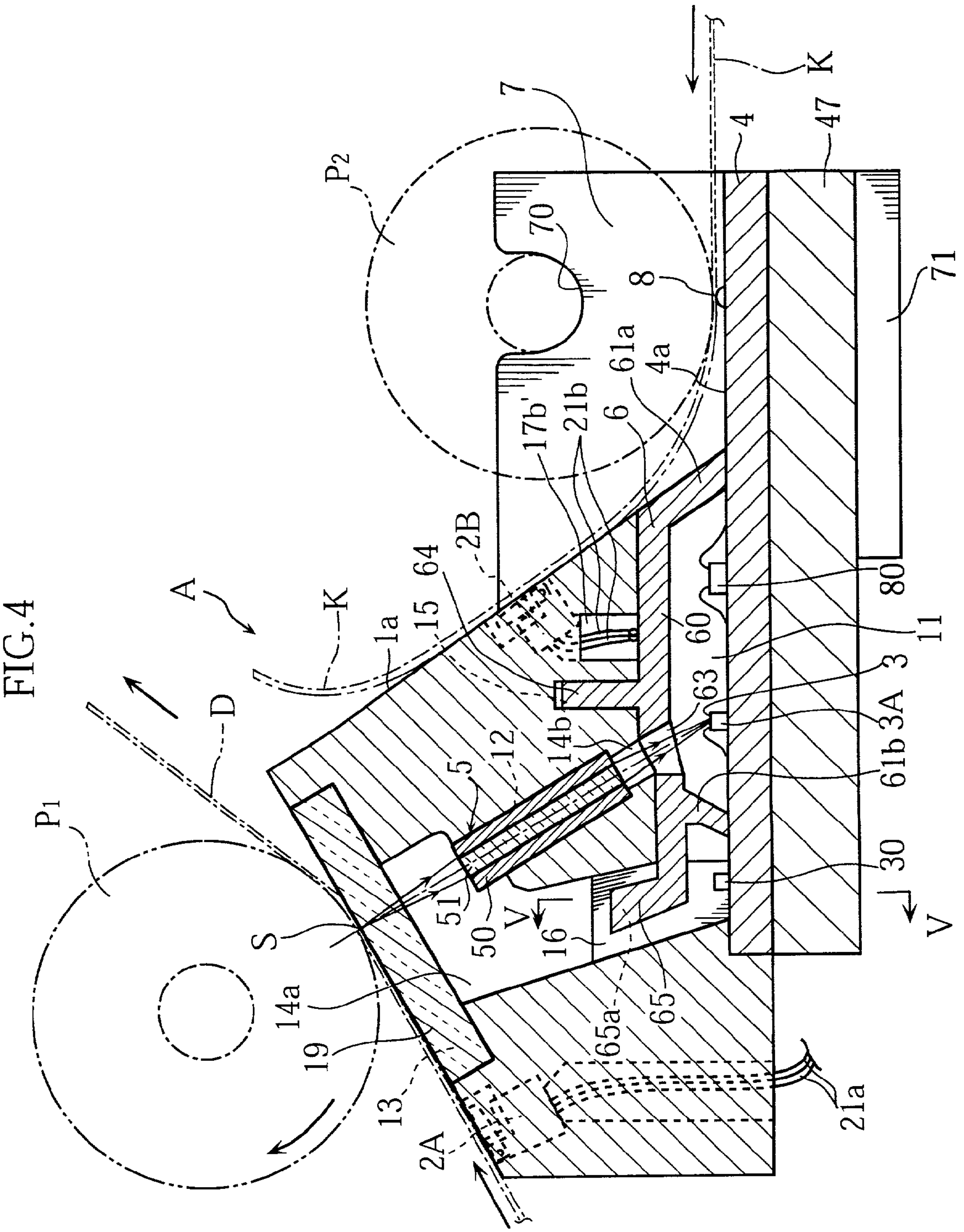
FIG. 4 is a sectional view taken along lines IV—IV in FIG. 1 showing the principal portion.
Figure 5:
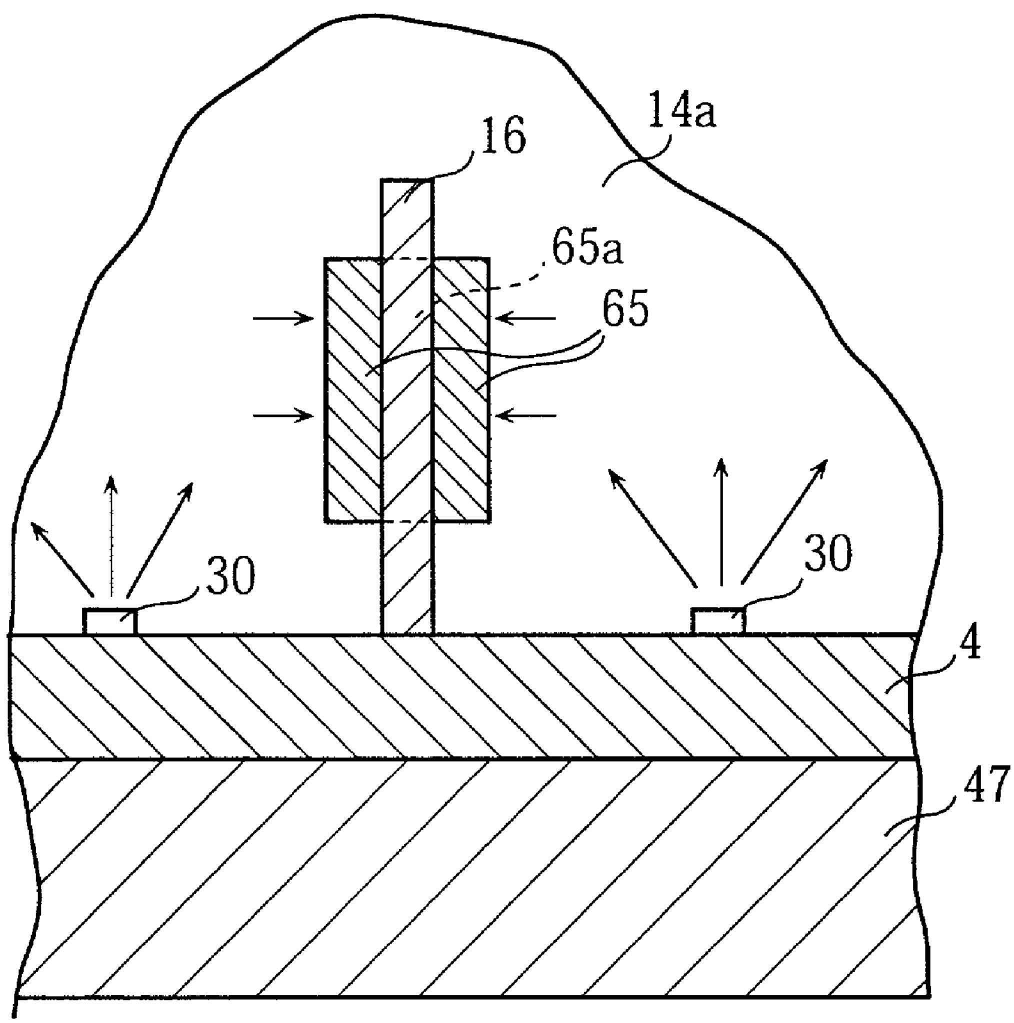
FIG. 5 is a sectional view taken along lines V—V in FIG. 4.

As clearly shown in FIG. 4, the upper wall 60 of the reflection preventing member 6 is formed with a plurality of projections 64 which are inserted into a plurality of recesses 15 provided in the case 1. The reflection preventing member 6 is thus mounted to the case 1. The reflection preventing member 6 is formed, at one of widthwise opposite edges thereof, with a plurality of clamping projections 65 each having a groove 65*a*. As clearly shown in FIG. 5, the case 1 is formed with ribs 16 arranged in the first light path 14*a* each of which is elastically clamped by the corresponding clamping projection 65 in its thickness direction. The reflection preventing member 6 is mounted to the case 1 by the clamping function of the clamping projections 65 for preventing the reflection preventing member from deviating longitudinally or widthwise relative to the case 1. The plural ribs 16 are arranged at a predetermined pitch longitudinally of the first light path 14*a* for enhancing the rigidity of the case 1.

Figure 3:
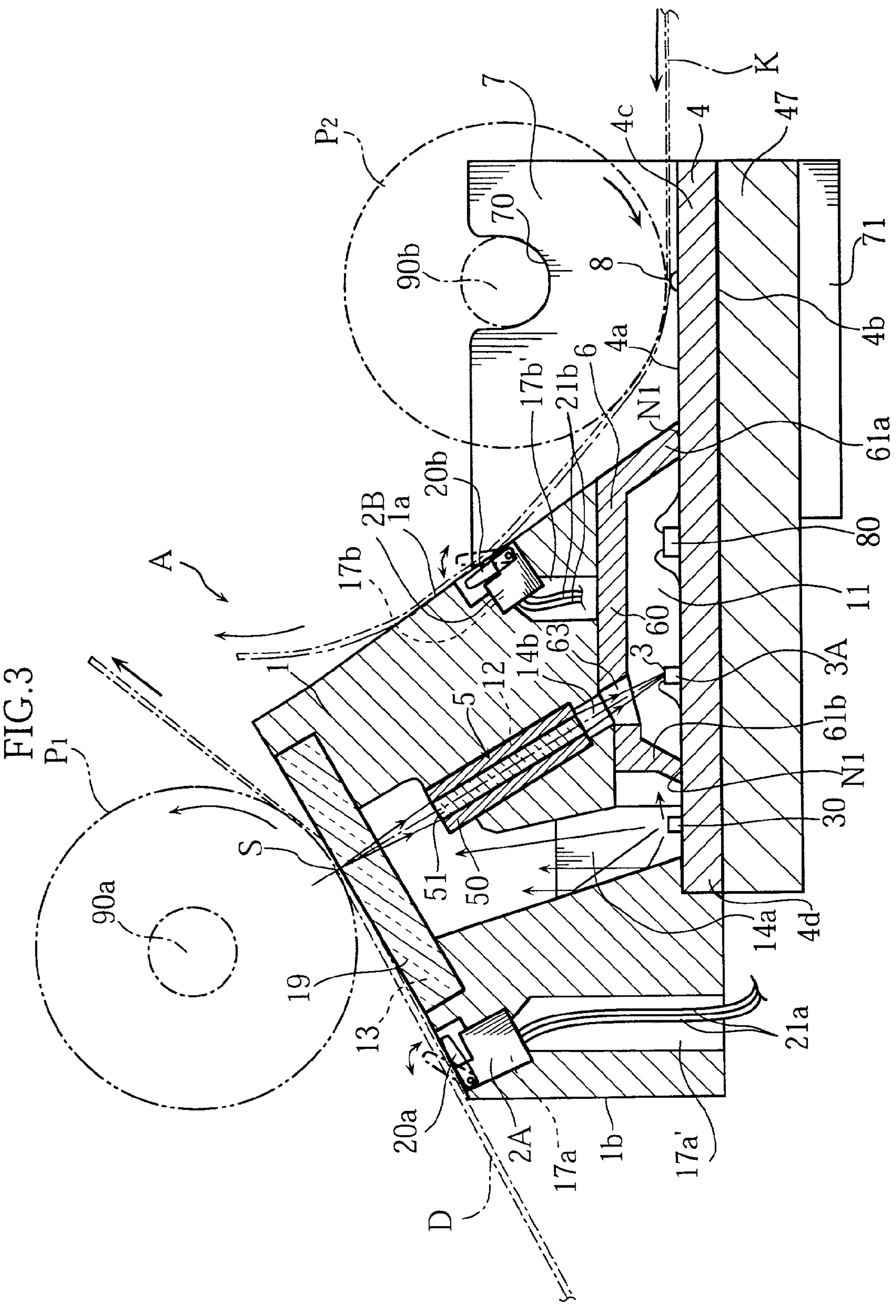
FIG. 3 is a sectional view taken along lines III—III in FIG. 1.

As clearly shown in FIG. 3, the upper surface of the case 1 is formed with a plurality of recesses 17*a* into which the sensors 2A are fitted, so that the sensors are incorporated adjacent the transparent cover 19. Each of the sensors 2A is provided with a lever 20*a* projecting upward relative to the upper surface of the case 1 in its normal state (i.e. when the document is not fed onto the transparent cover 19). When the lever 20*a* is pressed downward upon contacting the document D, the sensor outputs a predetermined detection signal. Each of the recesses 17*a* communicates with a hole 17*a*' provided below the recess 17*a*. A connection cord 21*a* for the sensor 2A extends downward through the hole 17*a*' to the outside of the case 1. As clearly shown in FIGS. 1 and 2, the sensors 2A are arranged at predetermined intervals longitudinally of the case 1 for detecting the width of the document D to be transferred to the transparent cover 19.

The sensors 2B are fitted into a plurality of recesses 17*b* formed in the outer side surface 1*a* of the case 1, and are thus built in the case 1. Each of the sensors 2B is provided with a lever 20*b* which is so biased as to project laterally outwardly from the outer side surface 1*a* of the case 1. The lever 20*b* is movable between an outwardly projecting position and an inwardly retreating position with respect to the outer side surface 1*a* depending on whether it is in contact with the recording paper K. When the lever 20*b* is in the projecting position without being depressed by the recording paper K, the sensor 2B outputs a predetermined detection signal for notifying the paper-out condition of the recording paper K. The case 1 is further formed with a groove 17*b*' extending longitudinally of the case below the recesses 17*b* in communication therewith. A connection cord 21*b* for each sensor 2B extends laterally through the groove 17*b* to the outside of the case 1 through each longitudinal end of the case 1 while being supported (not shown) by the reflection preventing member 6. The number of the sensors 2B may be two for example, and these two sensors 2B may be arranged at a predetermined pitch longitudinally of the case 1. This is because, the recording paper paid out from a roll of an elongated paper has a constant width, so that, unlike the document, width variations need not be considered. From this point of view, only one sensor 2B may be provided for detecting the recording paper. Similarly, when the width of the document need not be considered, only one sensor 2A may be provided for detecting the document.

Figure 6:
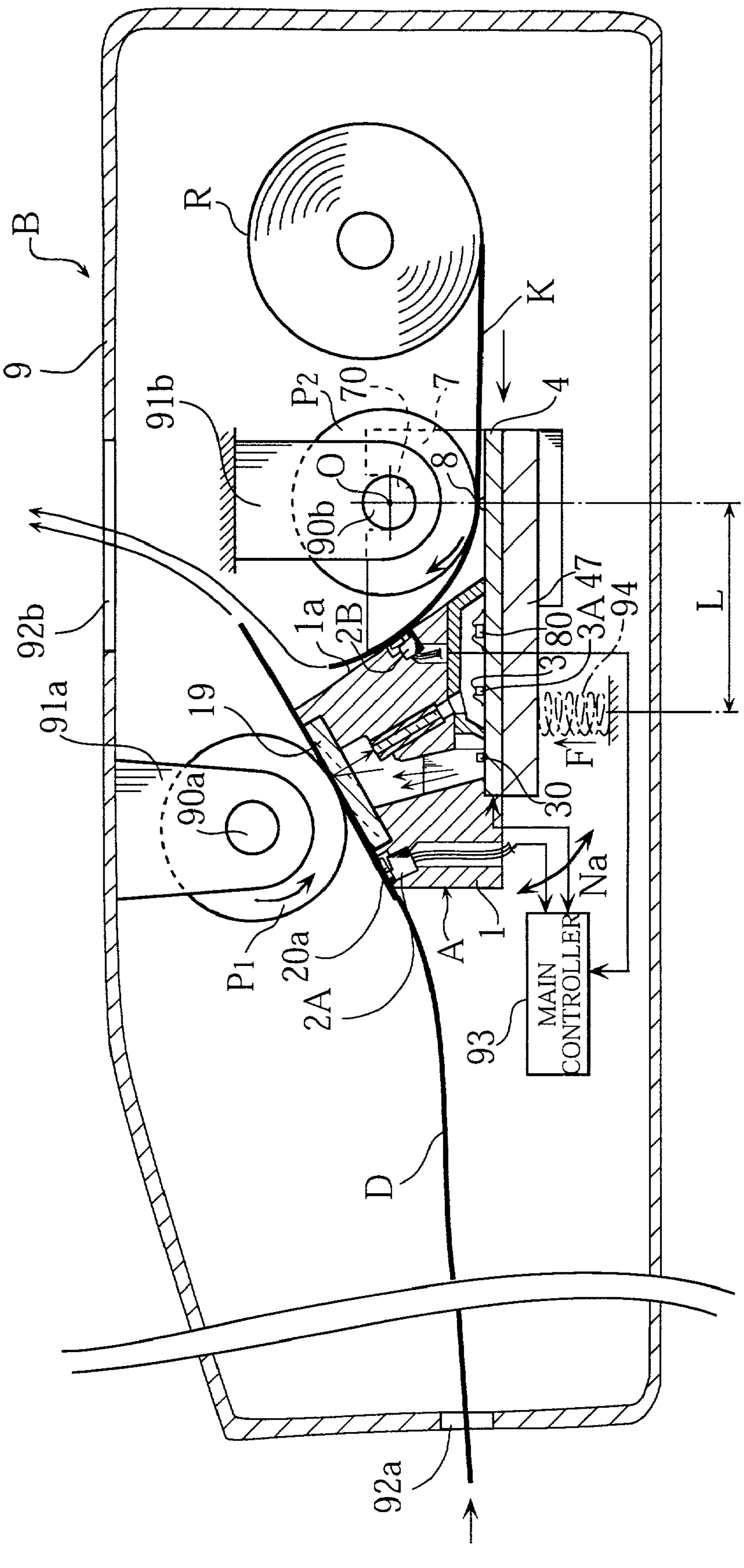
FIG. 6 schematically illustrates the structure of an image processing apparatus incorporating the image read/write head shown in FIG. 1.

FIG. 6 illustrates an image processing apparatus B incorporating the above-described image read/write head A.

The image processing apparatus includes a housing 9 made of synthetic resin for accommodating the image read/write head A, and a pair of platen rollers $P_1$, and $P_2$ for the document and the recording paper, respectively.

The platen roller $P_1$ has shaft portions 90*a* provided at longitudinally opposite ends thereof. The housing 9 is provided with brackets 91*a* for carrying the shaft portions 90*a* of the platen roller $P_1$ so that the roller body of the platen roller can face the surface of the transparent cover 19. The platen roller $P_1$, is driven to rotate for transferring the document D which is fed via an insertion port 92*a* provided in the housing 9 and guided between the platen roller $P_1$ and the transparent cover 19 toward a discharge port 92*b* of the housing 9 in close contact with the transparent cover 19. When the document D is being fed to the transparent cover 19, the document D passes over the sensors 2A.

The platen roller $P_2$ has shaft portions 90*b* provided at the longitudinally opposite ends. The shaft portions 90*b* are respectively fitted into the recesses 70 of the supports 7. As a result, the roller body of the platen roller $P_2$ is arranged in facing relationship to the heating elements 8. The shaft portions 90*b* are also supported by brackets 91*b* separately provided in the housing 9. The housing 9 also accommodates a roll R formed by winding an elongated thermosensitive recording paper K. The platen roller $P_2$ is driven to rotate for transferring the recording paper K which is paid out from the roll R and guided between the platen roller $P_2$ and the heating elements 8 toward a discharge port 92*b*. Before reaching the discharge port 92*b*, the recording paper K passes over the sensors 2B provided in the outer side surface 1*a* of the case 1.

The image read/write head A is pivotally movable up and down about the shaft portions 90*b*, as indicated by an arrow Na. Specifically, the shaft portions 90*b* of the platen roller $P_2$ are held at predetermined positions by the brackets 91*b*. On the other hand, the supports 7 of the image read/write head A are fitted slidably on the shaft portions 90*b* for circumferential movement. Thus, the shaft portions 90*b* serve as a pivotal axis of the image read/write head A. Below the heat sink plate 47, a spring 94 is provided in engagement with the reverse surface of the heat sink plate 47 for pushing the image read/write head A upward. The spring 94 is arranged at a portion which is offset, widthwise of the substrate 4 or the heat sink plate 47, from the center 0 of the shaft portions 90 toward the transparent cover 19 by an appropriate distance L. With the pushing force F of the spring 94, the image read/write head A is biased pivotally upward so that the surface of the transparent cover 19 is pressed against the platen roller $P_1$.

The image processing apparatus B incorporates a main controller 93 including various memories and a CPU for example. Based on a predetermined program or the functions of operation switches (not shown) provided in the image processing apparatus B, the main controller 93 controls the rotation of the paired platen rollers $P_1$, $P_2$, processes the image signals obtained in the image read/write head A and transmits the printing image data to the image read/write head A for input to the drive IC chips 80 while performing other operation control and data processing. The signals output from the sensors 2A, 2B are also transmitted to the main controller 93.

Next, the operation of the above-described image read/write head A and the image processing apparatus B will be described.

For reading an image of the document D, when the document D fed through the insertion port 92*a* into the housing 9 is guided onto the upper surface of the case 1, the levers 20*a* of the sensors 2A are depressed by the document D. Accordingly, the sensors 2A notify the presence of the document by transmitting signals to the main controller 93. As a result, the platen roller $P_1$, the light sources 30 and the light receiving elements 3 are driven under the control of the controller 93. When reading for one sheet of the document D has almost finished and the trailing edge of the document D has already passed over the levers 20*a*, each of the levers 20*a* returns to its original posture and projects upwardly from the upper surface of the case 1. At this time, the above-described signal output from the sensors 2A stops. The image reading of the document D by the image read/write head A is continued for a certain period of time after the termination of the signal output, and is then interrupted until another document D is newly set.

Image reading of the document D is performed by illuminating the surface of the document D with light emitted from the light sources 30 and receiving the reflected light by the light receiving elements 3 via the lenses 51. Since the light receiving elements 3 are surrounded by the black reflection preventing member 6 having high light absorbing ability, the light traveling from the document D toward the light receiving elements are prevented from being reflected around the light receiving elements 3.

The reflection preventing member 6 also prevents the light from outside the case 1 from reaching the light receiving elements 3, or the light emitted from the light sources 30 from directly traveling toward the light receiving elements 3. Particularly, the side walls 61*a*~61*d* of the reflection preventing member 6 are compressed into contact with the obverse surface 4*a* of the substrate 4, thereby reducing the likelihood of forming light entering gaps between these members. Further, even if such gaps are formed, the black coating of the substrate 4 provided at portions held in contact with the respective tip ends of the side walls 61*a*~61*d* absorbs most of the light progressing through the gaps. This further reliably prevents the light from the outside of the case 1 or the light emitted from the light sources 3 and traveling toward the light receiving elements 2 from disadvantageously entering the region surrounded by the reflection preventing member 6. As a result, it is possible to prevent the light receiving elements 3 from receiving undesirable light which may cause noises, so that a read image having a high image quality can be provided.

For subsequently printing the image on the recording paper K, the printing image data are transmitted from the main controller 93 to the drive ICs 80, which makes the heating elements 8 to be selectively heated. When the recording paper K is appropriately set, the levers 20*b* of the sensors 2B are depressed by the recording paper K. When the recording paper K runs out, the levers 20*b* projects outward from the outer side surface 1*a* of the case 1. At this time, the sensors 2B output signals to notify the paper-out condition. In this case, the image printing is interrupted, and a paper-out message may be displayed on a display portion (not shown) provided in the image processing apparatus B for example.

The image read/write head A includes the sensors 2A, 2B of its own for detecting a document and a recording paper, respectively. Therefore, in assembling the image processing apparatus B, it is not necessary to mount these sensors 2A, 2B separately from the image read/write head A in the housing 9. Moreover, in mounting the image read/write head A in the housing 9, troublesome positioning of the sensors 2A, 2B is not necessary, because the sensors are appropriately positioned at the predetermined portions of the image read/write head A. Therefore, it is possible to easily assemble the image processing apparatus B.

The platen roller $P_2$ and the image read/write head A can be positioned relative to each other by fitting the shaft portions 90*b* onto the supports 7. Therefore, the image read/write head A and the platen roller $P_2$ can be easily mounted in the housing 9 as appropriately positioned relative to each other. On the other hand, the image read/write head A is pivotally movable about the shaft portions 90*b*, and the transparent cover 19 is pressed against the platen roller $P_1$ by the elastic force F of the spring 94. Therefore, positioning of the platen roller $P_1$, relative to the image read/write head A is also easily performed. Moreover, the pivotal movement of the image read/write head A about the shaft portions 90*b* allows the distance between the platen roller $P_1$, and the transparent cover 19 to follow the thickness of the document D. Therefore, it is possible to transfer documents of various thicknesses smoothly in close contact with the surface of the transparent cover 19 while also preventing the jam of documents D.

In the image processing apparatus B, both of the paired platen rollers $P_1$, $P_2$ are arranged above the transparent cover 19 or the substrate 4. Therefore, the three members, i.e., the paired platen rollers $P_1$, $P_2$ and the image read/write head A are prevented from becoming bulky in the height direction of the image processing apparatus B, which leads to a thickness reduction of the image processing apparatus B.

In the image read/write head A, all of the light sources 30, the sensor IC chips 3A incorporating the light receiving elements 3, the drive IC chips 80, and the heating elements 8 are mounted on the obverse surface 4A of the substrate 4. Accordingly, the wiring pattern for these components is also provided on the obverse surface 4*a* of the substrate 4. Therefore, mounting of these components and forming of the wiring pattern can be performed without turning over the substrate 4, which enhances the productivity.

The reflection preventing member 6 collectively surrounds the sensor IC chips 3A incorporating the light receiving elements 3, and the drive IC chips 80. Specifically, the reflection preventing member 6 does not include a wall for partitioning the sensor IC chips 3A and the drive IC chips 80. Therefore, even when the distance between the row of IC chips 3A and the row of IC chips 80 is small, it is possible to prevent the reflection preventing member 6 from undesirably contacting these IC chips 3A, 80 or the wires bonded thereto. This also enhances the productivity of the image read/write head A.

In the image processing apparatus B, image reading of the document D and image printing on the recording paper K may be simultaneously performed. Since the outer side surface 1*a* of the case 1 is so inclined as to become farther from the platen roller $P_2$ as it extends upward, the transparent cover 19 can be positioned away from the platen roller $P_2$. Further, the transparent cover 19 is so inclined that its obverse surface is oriented away from the platen roller $P_2$, the platen roller $P_1$ which faces the transparent cover 19 can be positioned away from the platen roller $P_2$. Therefore, it is possible to keep a relatively long distance between the paired platen rollers $P_1$ and $P_2$ while also preventing the image read/write head A from becoming large. This structure is advantageous in preventing the document transfer path and the recording paper transfer path provided by the paired platen rollers $P_1$, and $P_2$, respectively; from interfering with each other.

FIGS. 7–14 illustrate another example of the present invention. In this figures, the elements which are identical or similar to those of the above-described embodiment are designated by the same reference signs as those used for the above-described embodiment.

Figure 7:
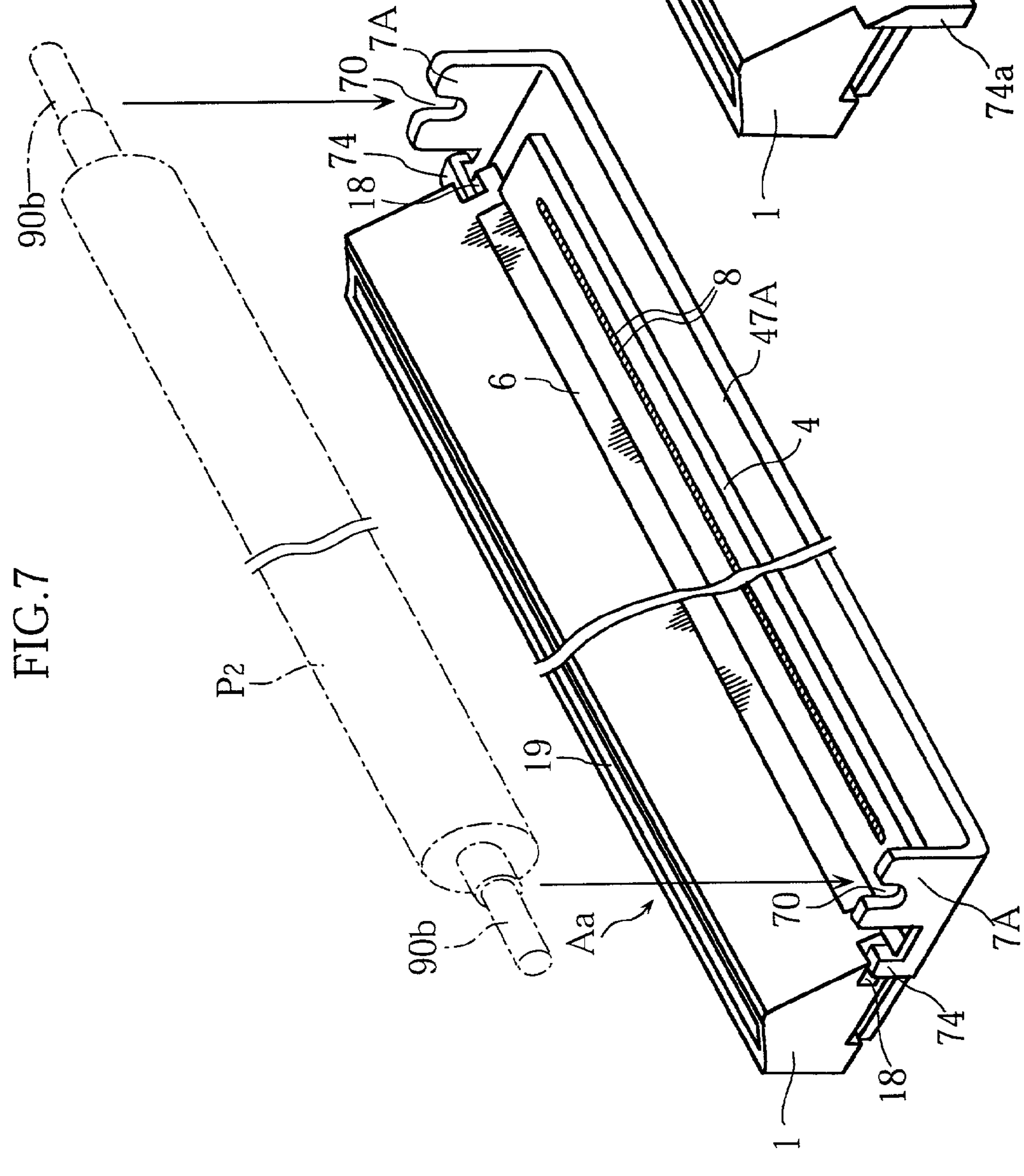
FIG. 7 is a perspective view showing another example of image read/write head in accordance with the present invention.

In the image read/write head Aa shown in FIG. 7, a pair of supports 7A for supporting a platen roller $P_2$ are provided utilizing a heat sink plate 47A. Specifically, the pair of supports 7A are formed by raising the longitudinally opposite ends of the heat sink plate 47A, which comprises a metal plate and is disposed on the reverse surface of a substrate 4, to flank the longitudinally opposite ends of the substrate 4. Similarly to the supports 7 in the above-described embodiment, each of the supports 7A is formed with a recess 70 for fitting the corresponding shaft portion 90*b* of the platen roller $P_2$.

With the image read/write head Aa, the platen roller $P_2$ can be supported by the supports 7A, similarly to the image read/write head A in the above-described embodiment. Further, it is possible to easily position the platen roller $P_2$ relative to the heating elements 8.

Figure 8:
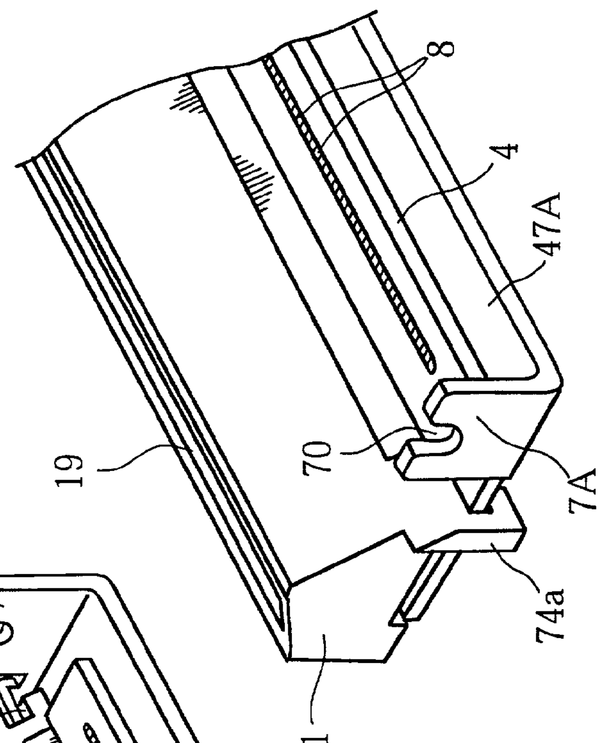
FIG. 8 is a perspective view showing the principal portion of another example of image read/write head in accordance with the present invention.

In this image read/write head Aa, the longitudinally opposite ends of the heat sink plate 47A are integrally formed with a pair of engaging projections 74, which are brought into engagement with a pair of recesses 18 formed at the longitudinally opposite ends of the case 1. With this structure, it is possible to easily assemble the case 1 with the heat sink plate 47 and the substrate 4. Assembling of the case 1 can be enhanced by another means. For example, the case 1 may be integrally formed with engaging projections 74*a* for engagement with the reverse surface of the heat sink plate 47A, as shown in FIG. 8.

In the present invention, as is clear from the structure shown in FIG. 7, the supporting means for supporting the platen roller may be provided at the heat sink plate, or the substrate or any other member constituting the image read/write, instead of providing at the case. Moreover, instead of providing a supporting means for supporting the recording paper platen roller, a supporting means for supporting the document platen roller may be provided. Alternatively, the image read/write head in accordance with the present invention may be provided with two supporting means for supporting the recording paper platen roller and the document platen roller, respectively.

The platen roller may be supported by the supporting means in various manners, and the supporting manner is not limitative on the present invention. For example, in the present invention, the platen roller $P_2$ may be supported only by the supports 7 without using the brackets 91*b* shown in FIG. 6. Further, instead of the generally semicircular recess 70, the supporting means in the present invention may be formed with a recess of another configuration, or a non-cutout hole for inserting therethrough the shaft portion of the platen roller.

Figure 9:
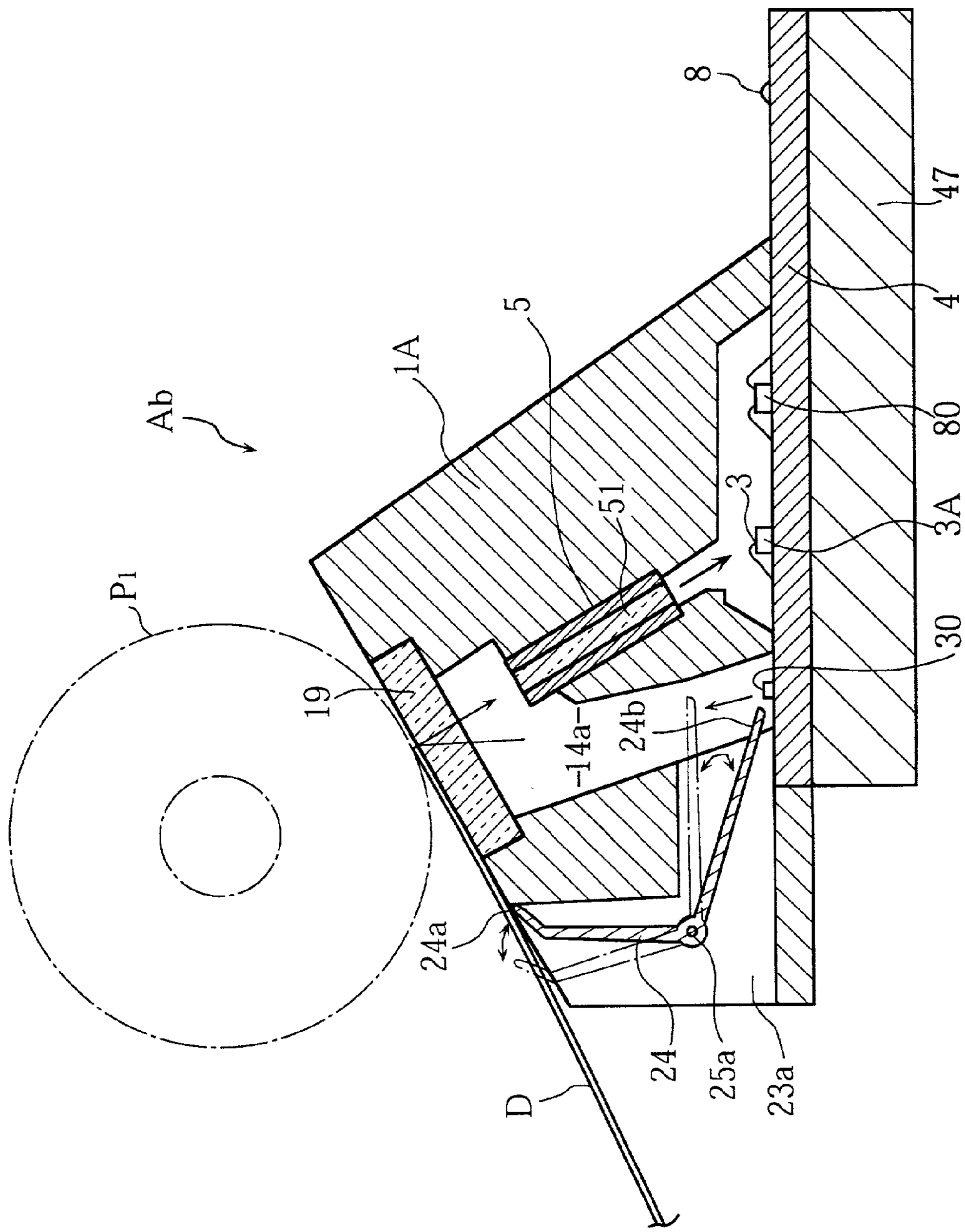
FIG. 9 is a sectional view showing another example of image read/write head in accordance with the present invention.

FIG. 9 illustrates an image read/write head Ab which includes a movable member 24 provided in a hollow portion 23*a* of a case 1A. The movable member 24, which is L-shaped in section, has an intermediate portion pivotally supported on a shaft 25*a*. One end 24*a* of the movable member is movable to project outward and retreat inward relative to the upper surface of the case 1A which provides the transfer path for the document D. The movable member 24 is normally biased by an elastic member (not shown) in a predetermined direction so that the end 24*a* projects upward relative to the upper surface. When the document D is fed onto the upper surface of the case 1A, the end 24*a* is pressed downward as indicated by solid lines in the figure, causing the entirety of the movable member 24 to pivot about the shaft 25*a*. The other end 24*b* of the movable member 24 is arranged within a first transfer path 14*a*. When the end 24*a* projects upward relative to the upper surface of he case 1A, the other end 24*b* is so positioned as to block the light emitted from the light sources 30, as indicated by phantom lines in the figure. On the other hand, when the end 24*a* is pressed downward by the document D, the other end 24*b* moves to a position which does not block the light emitted from the light sources, as indicated by solid lines in the figure.

In the image read/write head Ab having the above-described structure, the light emitted from the light sources is blocked by the end 24*b* of the movable member 24 when the document D is not set on the upper surface of the case 1A. Therefore, the light emitted from the light sources 30 does not reach the transparent cover 19, and hence, is not received by the light receiving elements 3. On the other hand, when the document D is set on the upper surface of the case 1A and the transparent cover 19, the end 24*a* of the movable member 24 is pressed downward by the document D so that the other end 24*b* correspondingly moves to a position which does not block the light emitted from the light sources 30. Therefore, the light emitted from the light source 30 reaches the surface of the document on the transparent cover 19 and is reflected thereon to be received by the light receiving elements 3. Therefore, whether or not the document D is set on the transparent cover 19 can be appropriately determined by whether or not the light receiving elements 3 are in a state capable of receiving light. Such a document detecting means can be provided at a low cost by effectively utilizing the light receiving elements 3 and the light sources 30 incorporated in the image read/write head.

In the image read/write head Ab having the above-described structure, all of the light receiving elements 3 and the light sources 30 need not be utilized for determining the presence or absence of the document. That is, the presence or absence of the document can be determined by utilizing part of the light receiving elements and part of the light sources. With such a structure, it is only necessary that the end 24*b* of the movable member 24 has a size sufficient for blocking the light emitted from a selected one or ones of the light sources 30, so that the size of the movable member 24 can be correspondingly reduced. This is true with respect to image read/write heads Ac, Ad which will be described later.

Figure 10:
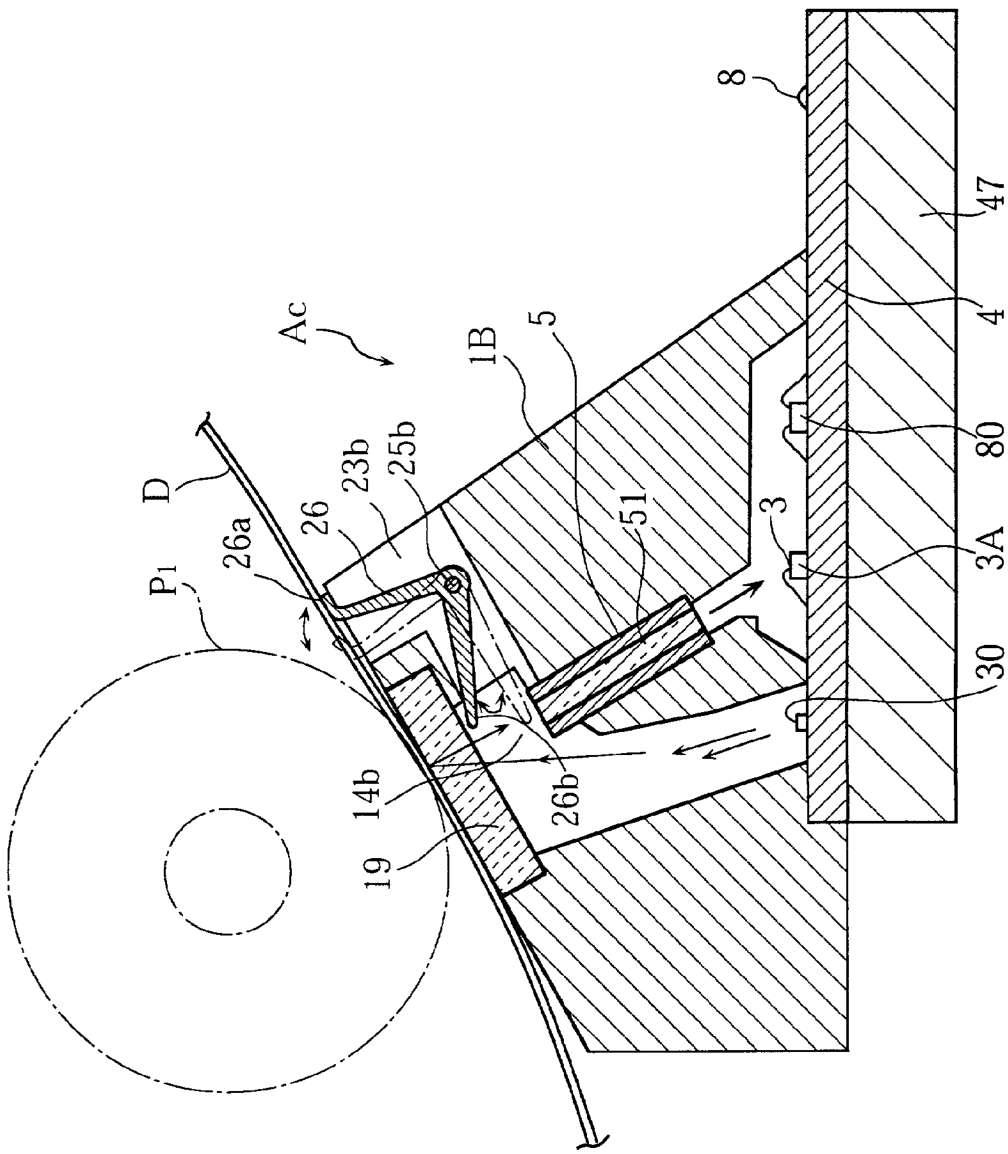
FIG. 10 is a sectional view showing another example of image read/write head in accordance with the present invention.

FIG. 10 illustrates an image read/write head Ac which includes a movable member 26 provided in a hollow portion 23*b* formed at an upper portion of a case 1B. The movable member 26, which is L-shaped in section, has an intermediate portion pivotally supported on a shaft 25*b*. One end 26*a* of the movable member 26 is movable to project outward and retreat inward relative to the upper surface of the case 1B which provides the transfer path for the document D. The movable member 26 is normally biased by an elastic member (not shown) in a predetermined direction so that the end 26*a* projects upward relative to the upper surface. When the document D is present on the upper surface of the case 1B, the end 26*a* is pressed downward as indicated by solid lines in the figure, causing the entirety of the movable member 26 to pivot about the shaft 25*b*. The other end 26*b* of the movable member 26 is arranged within a second transfer path 14*b*. When the end 26*a* projects upward relative to the upper surface of the case 1B, the other end is positioned in facing relationship to a lens 51, thereby preventing light from entering the lens 51. On the other hand, when the end 26*a* is pressed downward by the document D, the other end 26*b* moves to a position which does not face the lens 51, thereby allowing light from the image reading line S to enter the lens 51.

In the image read/write head Ac having the above-described structure, when the document D is not present on the upper surface of the case 1B and hence the end 26*a* of the movable member 26 is not depressed by the document D, the lens 51 is covered with the other end 26*b*. Therefore, the light receiving elements 3 cannot receive light. On the other hand, when the document D is present on the upper surface of the case 1B and the transparent cover 19 to press the end 26*a* of the movable member 26 downward, the other end 26*b* moves to a position which does not face the lens 51. Therefore, the light emitted from the light source 30 and reflected on the surface of the document D progresses through the lens 51 to be received by the light receiving elements 3. Thus, also in this image read/write head Ac, similarly to the above-described image read/write head Ab, whether or not the document D is present at a predetermined position can be appropriately determined by whether or not the light receiving elements 3 are in a state capable of receiving light. Thus, the light receiving elements 3 and the light sources 30 can be effectively utilized for detecting the document.

Figure 11:
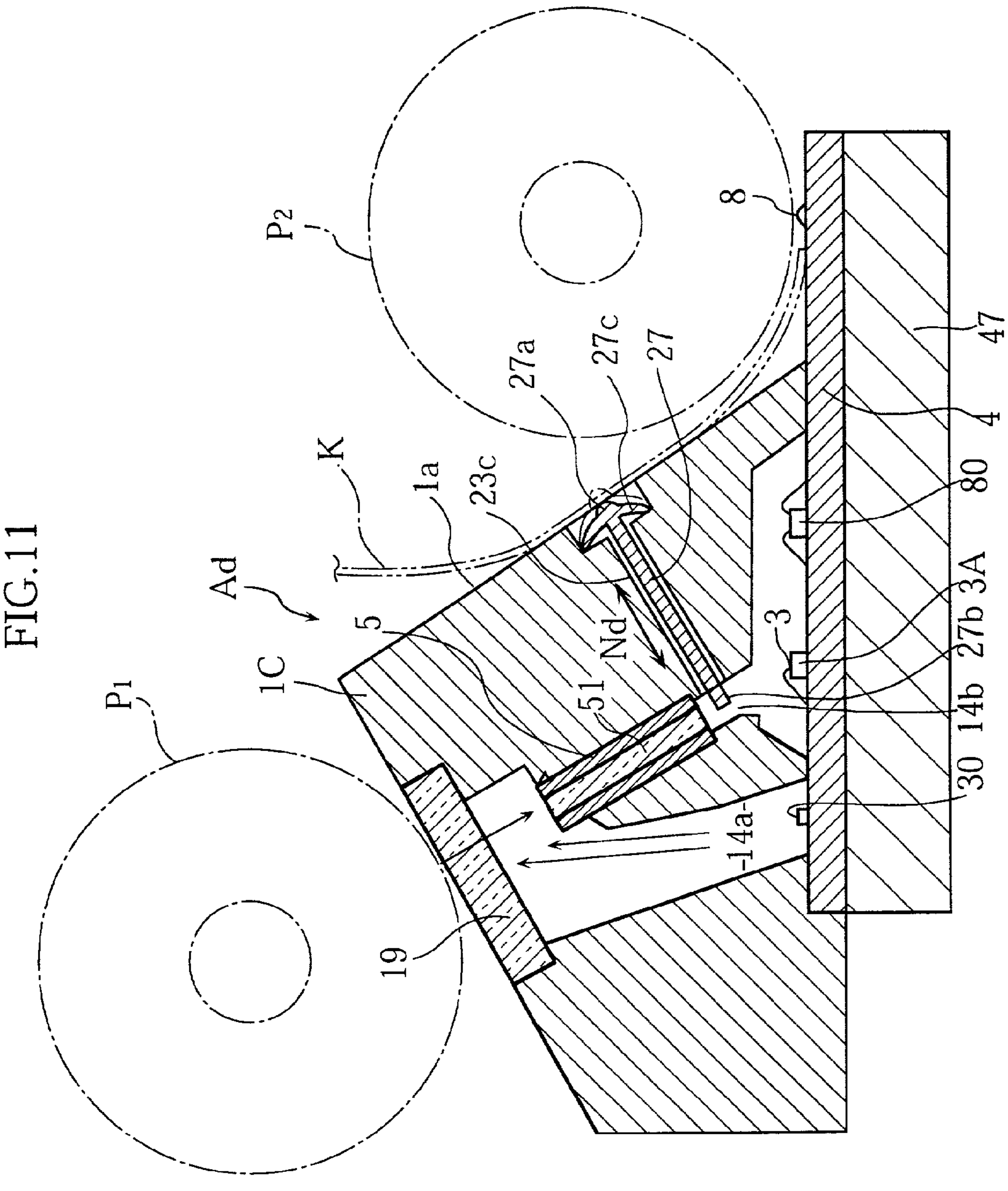
FIG. 11 is a sectional view showing another example of image read/write head in accordance with the present invention.

FIG. 11 illustrates an image read/write head Ad which includes a case 1C formed with a slit-shaped hollow portion 23*c* extending from an outer side surface 1*a* to a second light transfer path 14*b*. A movable member 27 is provided in the hollow portion 23*c*. The movable member 27 is slidable in the hollow portion 23*c* in the directions indicated by an arrow Nd, and has one end 27*a* which is movable to project outward and retreat inward relative to the outer side surface 1*a* of the case 1C which serves as a transfer path for the recording paper K. The movable member 27 has a spring portion 27*c* having an elastic force for normally forcing the end 27*a* to project outward from the outer side surface 1*a*. When the recording paper K is in contact with the outer side surface 1*a*, the movable member 27 moves against the elastic force so that the end 27*a* retreats into the case 1C. The other end 27*b* of the movable member 27 retreats in the hollow portion 23*c* so as not to block the second light transfer path 14*b* below lenses 51 when the end 27*a* projects outward from the outer side surface 1*a*. On the other hand, when the end 27*a* retreats into the case 1C, the other end 27*b* projects from the hollow portion 23*c* into the second light transfer path 14*b*.

With the image read/write head Ad having the above-described structure, in accordance with the presence or absence of the recording paper K on the outer side surface 1*a* of the case 1C, the second light transfer path 14*b* shifts between a blocked state and a non-blocked state depending on the movement of the end 27*b* of the movable member 27. Therefore, whether or not the recording paper K is present at a predetermined position can be appropriately determined based on whether or not the light receiving elements 3 are in a state capable of receiving light emitted from the light sources 30 and reflected by the document D or the platen roller $P_1$. However, with the above-described structure, the image reading operation of the document cannot be performed when the second light transfer path 14*b* is blocked by the end 27*b*. Therefore, the image read/write head Ad may be preferably used where image reading of the document and printing on the recording paper are not simultaneously carried out. Moreover, since the image reading operation cannot be performed while the recording paper K is pressing the end 27*a* of the movable member 27, cut sheets of recording paper may be preferably used for the image read/write head Ad for avoiding the condition in which the end 27*a* of the movable member 27 is always pressed by the recording paper.

The specific structure of the detecting means for the document and the recording paper is not limited in the present invention to those of the above-described embodiments. In the present invention, a sensor or a switch structured differently from those of the above-described embodiments may be employed for detecting the document and the recording paper. As a detecting means, a reflective type photointerrupter or another optical sensor may be employed for detecting the document and the recording paper in a non-contacting manner. Further, the position and the number of the detecting means in the above-described embodiments are not limitative.

Figure 12:
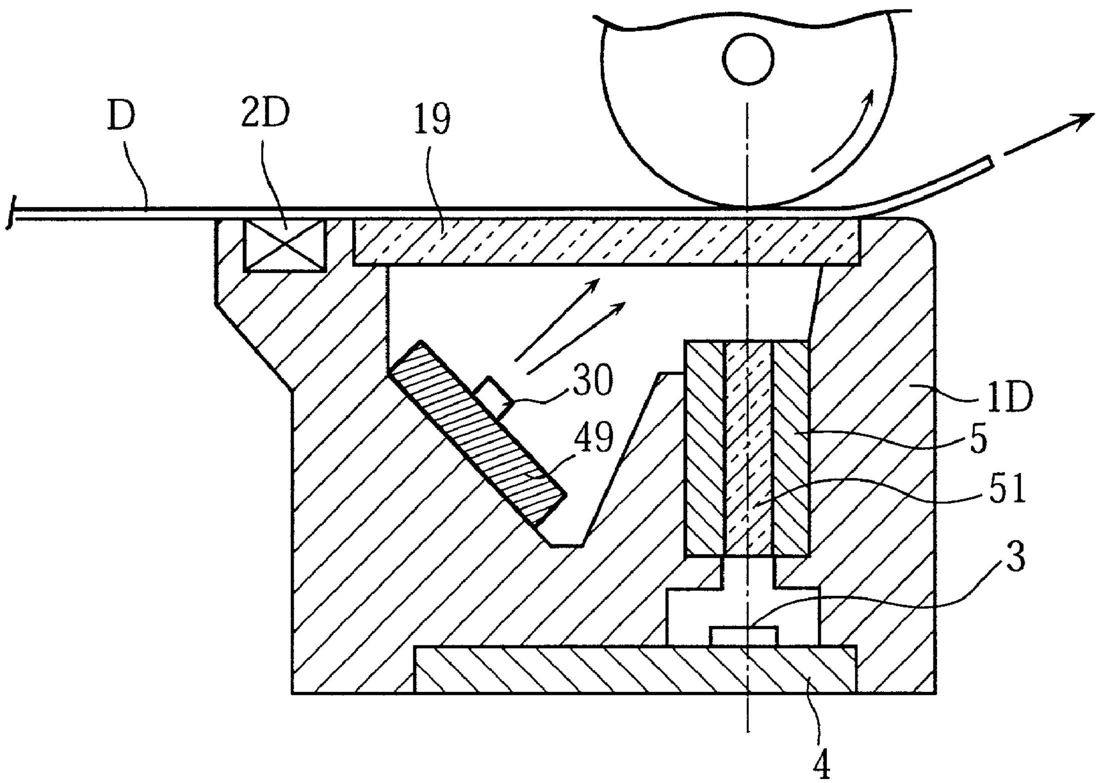
FIG. 12 is a sectional view showing an example of image read head in accordance with the present invention.
Figure 13:
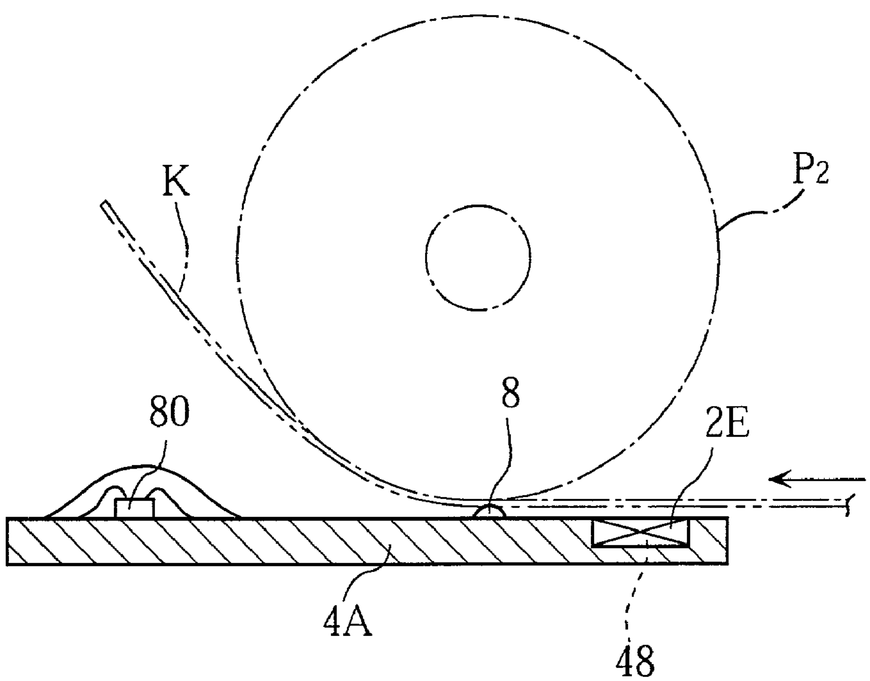
FIG. 13 is a sectional view showing an example of printhead in accordance with the present invention.

Although an image read/write head is exemplarily described in the above-described embodiments, the present invention is not limited thereto. For example, as shown in FIG. 12, the present invention is applicable to an image read head which includes a case 1D, a transparent cover 19, a lens array 5, a plurality of light receiving elements 3 and a plurality of light sources 30, but which does not include printing elements. In this image read head, the case 1D is provided with a detecting means 2D for a document. With such a structure, mounting of the detecting means can be performed more easily than mounting the detecting means separately from the image reading head.

The present invention is also applicable to a printhead which has the sole function of printing on a recording paper. The printhead shown in FIG. 13 includes a substrate 4A on which are mounted a plurality of heating elements 8 and a plurality of drive IC chips 80 for providing drive control of the heating elements 8. The substrate 4A is formed with a recess 48 which receives a sensor 2E for detecting a recording paper. The printhead having such a structure is included in the scope of the present invention.

Figure 14:
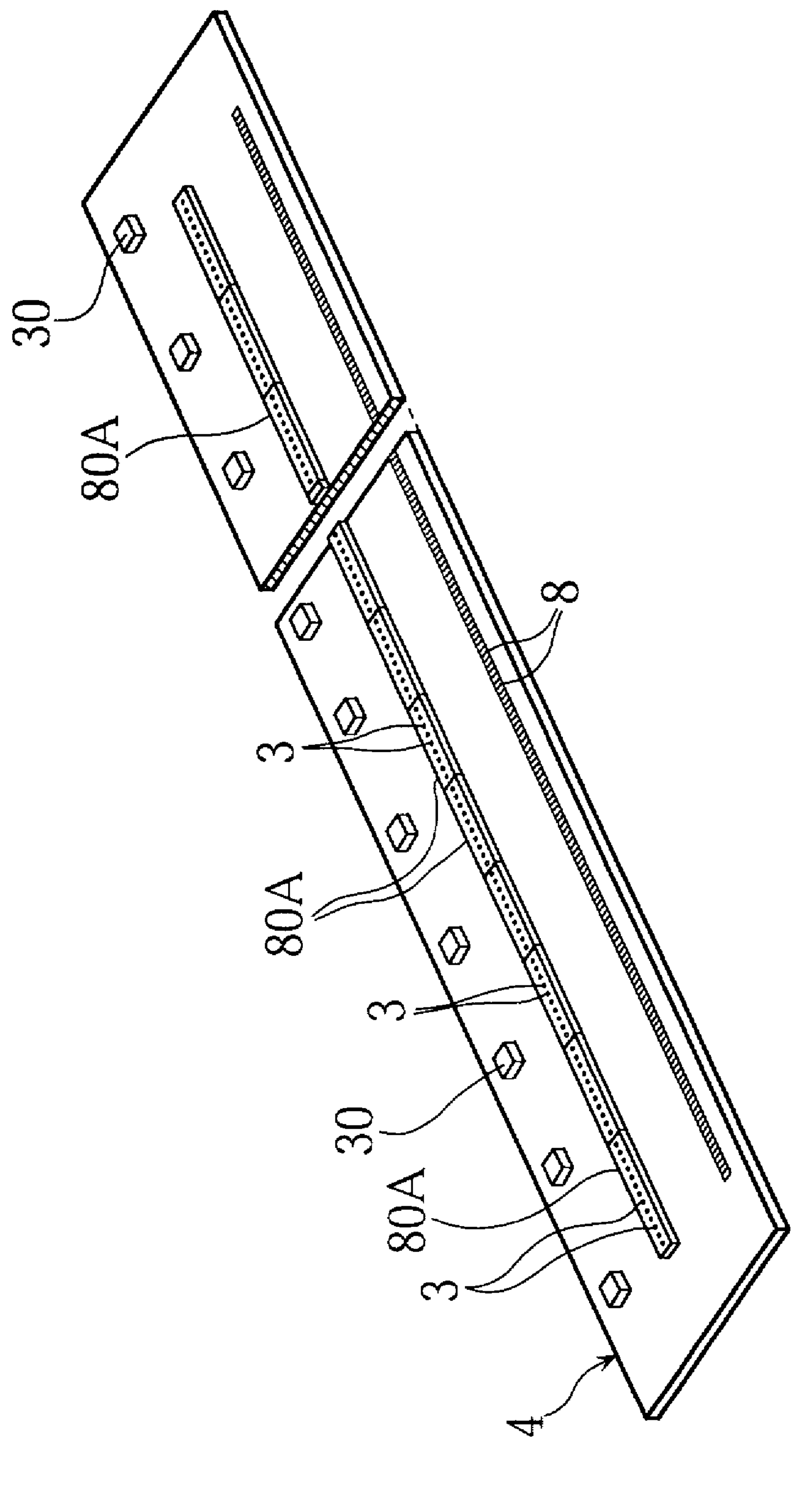
FIG. 14 is a perspective view showing another example of components mounted on the substrate of an image read/write head in accordance with the present invention.
Figure 15:
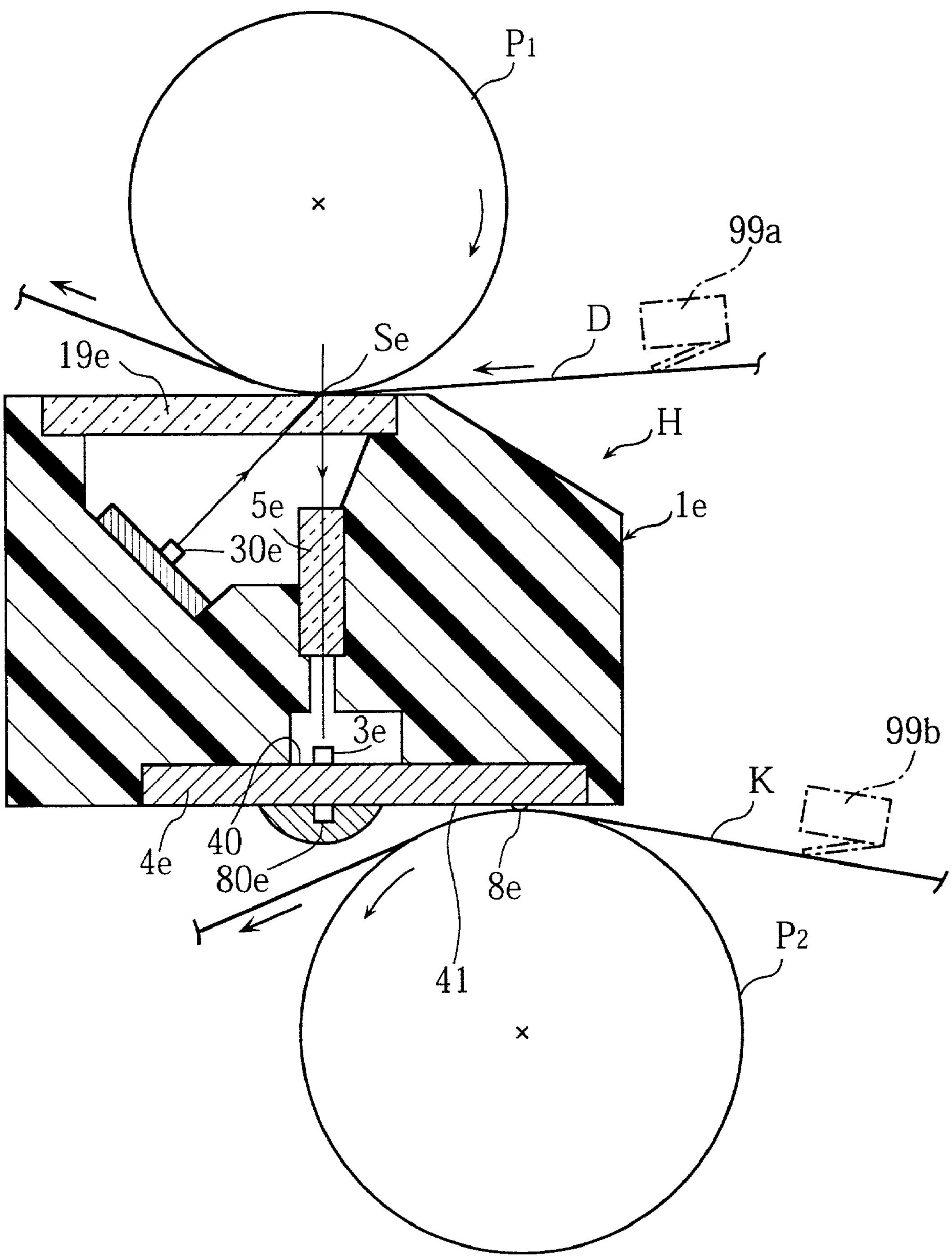
FIG. 15 is a sectional view showing a prior art structure.

FIG. 14 illustrates the parts mounted on a substrate 4 of an image read/write head. In the illustrated structure, a plurality of light receiving elements 3 are integrally built in a plurality of drive IC chips 80A. With this structure, as compared with the above-described embodiment in which a plurality of sensor IC chips 3A incorporating a plurality of light receiving elements 3 are provided separately from the drive IC chips 80, the number of parts mounted on the substrate 4 can be decreased so that the image read/write head can be manufactured with enhanced efficiency.

The specific details of the present invention may be modified in various ways apart from the above-described embodiments. For example, instead of the LEDs, a cold cathode tube may be employed as a light source.

What is claimed is:

1. An image read/write head comprising:

a substrate which carries a plurality of light receiving elements, a plurality of printing elements and a plurality of drive IC chips incorporating driving circuits for providing drive control of the printing elements;

a case mounted on the case for surrounding the plurality of light receiving elements while avoiding the plurality of printing elements;

a transparent cover mounted to the case for contact with a document being transferred;

a light source disposed in the case for illuminating the document; and a plurality of lenses disposed in the case for forming, on the plurality of light receiving elements, an image of the document illuminated by the light source;

the image read/write head further including supporting means for supporting a platen roller disposed in facing relationship to at least either one of the transparent cover and the plurality of printing elements.

2. The image read/write head according to claim 1, wherein the case and the supporting means are integrally molded of resin.

3. The image read/write head according to claim 1, wherein each of the printing elements comprises a heating element, the substrate being mounted to a heat sink plate, part of the heat sink plate providing the supporting means.

4. The image read/write head according to claim 1, wherein the plurality of light receiving elements, the plurality of printing elements and the plurality of drive IC chips are mounted on a same surface of the substrate.

5. The image read/write head according to claim 4, wherein the light receiving elements are integrally built in the drive IC chips.

6. An image processing apparatus comprising an image read/write head and a pair of platen rollers for a document and a recording paper, respectively, the image read/write head including:

a substrate which carries a plurality of light receiving elements, a plurality of printing elements and a plurality of drive IC chips incorporating driving circuits for providing drive control of the printing elements;

a case mounted on the case for surrounding the plurality of light receiving elements while avoiding the plurality of printing elements;

a transparent cover mounted to the case for contact with a document being transferred;

a light source disposed in the case for illuminating the document; and a plurality of lenses disposed in the case for forming, on the plurality of light receiving elements, an image of the document illuminated by the light source;

the image read/write head further including supporting means for supporting at least one of the paired platen rollers.

7. The image processing apparatus according to claim 6, wherein each of the platen rollers is held by a member provided separately from the image read/write head;

the supporting means being fitted on a shaft portion of the recording paper platen roller for allowing pivotal movement of the image read/write head about the shaft portion;

the image read/write head being biased by an elastic member in a pivotal direction for pressing the transparent cover against the document platen roller.

8. An image read/write head comprising:

a substrate which carries a plurality of light receiving elements, a plurality of printing elements and a plurality of drive IC chips incorporating driving circuits for providing drive control of the printing elements;

a case mounted on the case for surrounding the plurality of light receiving elements while avoiding the plurality of printing elements;

a transparent cover mounted to the case for contact with a document being transferred;

a light source disposed in the case for illuminating the document; and a plurality of lenses disposed in the case for forming, on the plurality of light receiving elements, an image of the document illuminated by the light source;

the plurality of light receiving elements, the plurality of printing elements and the plurality of drive IC chips being mounted on a same surface of the substrate;

the image read/write head further including a reflection preventing member provided separately from the case for collectively surrounding the plurality of light receiving elements and the plurality of drive IC chips.

9. The image read/write head according to claim 8, wherein the reflection preventing member is black.

10. The image read/write head according to claim 8, wherein the reflection preventing member includes mounting means for positioning and mounting the reflection preventing member with respect to the case.

11. The image read/write head according to claim 8, wherein the reflection preventing member includes an upper wall facing but spaced from the plurality of light receiving elements and the plurality of drive ICs thicknesswise of the substrate, the upper wall including a slit for allowing light traveling through the plurality of lenses to reach the plurality of light receiving elements, the reflection preventing member also including a plurality of elastically deformable side walls projecting from the upper wall toward the substrate into contact therewith.

12. The image read/write head according to claim 11, wherein the substrate is black at least at portions in contact with the plurality of side walls.

13. The image read/write head according to claim 8, wherein the light source is mounted beside the plurality of light receiving elements on said surface of the substrate on which the plurality of light receiving elements are mounted;

the reflection preventing member including a side wall for separating the light source from the plurality of light receiving elements.

14. An image read/write head comprising:

a substrate which carries a plurality of light receiving elements, a plurality of printing elements and a plurality of drive IC chips incorporating driving circuits for providing drive control of the printing elements;

a case mounted on the case for surrounding the plurality of light receiving elements while avoiding the plurality of printing elements;

a transparent cover mounted to the case for contact with a document being transferred;

a light source disposed in the case for illuminating the document; and a plurality of lenses disposed in the case for forming, on the plurality of light receiving elements, an image of the document illuminated by the light source;

the image read/write head further including detecting means for detecting at least one of the document fed onto the transparent cover and a recording paper fed to a position facing the plurality of printing elements.

15. The image read/write head according to claim 14, wherein the detecting means includes a movable member having one end for contacting the document in a document transfer path, the movable member having another end for facing the light source;

the movable member being so arranged that said another end blocks light traveling from the light source toward the transparent cover when said one end is out of contact with the document, whereas said another end retreats to a position which does not block the light when said one end is in contact with the document.

16. The image read/write head according to claim 14, wherein the detecting means includes a movable member having one end for contacting the document in the document transfer path, the movable member having another end arranged in a light path extending from the transparent cover to the plurality of light receiving elements;

the movable member being so arranged that said another end blocks light traveling from the transparent cover toward the plurality of light receiving elements when said one end is out of contact with the document, whereas said another end retreats to a position which does not block the light when said one end is in contact with the document.

17. The image read/write head according to claim 14, wherein the detecting means includes a movable member having one end for contacting the recording paper in a recording paper transfer path, the movable member having another end arranged in a light path extending from the transparent cover to the plurality of light receiving elements;

the movable member being so arranged that said another end moves between a position for blocking light traveling from the transparent cover toward the plurality of light receiving elements and a position which does not block the light depending on whether or not said one end is in contact with the recording paper.

18. An image read/write head comprising:

a substrate which carries a plurality of light receiving elements, a plurality of printing elements and a plurality of drive IC chips incorporating driving circuits for providing drive control of the printing elements;

a case mounted on the case for surrounding the plurality of light receiving elements but avoiding the plurality of printing elements;

a transparent cover mounted to the case for contact with a document being transferred;

a light source disposed in the case for illuminating the document; and a plurality of lenses disposed in the case for forming, on the plurality of light receiving elements, an image of the document illuminated by the light source;

the plurality of light receiving elements, the plurality of printing elements and the plurality of drive IC chips are mounted on a same surface of the substrate;

the image read/write head further including:

supporting means for supporting a platen roller disposed in facing relationship to at least either one of the transparent cover and the plurality of printing elements;

a reflection preventing member provided separately from the case for collectively surrounding the plurality of light receiving elements and the plurality of drive IC chips; and detecting means for detecting at least one of the document fed onto the transparent cover and a recording paper fed to a position facing the plurality of printing elements.

* * * * *